US009572389B2

(12) United States Patent
Twardowski et al.

(10) Patent No.: US 9,572,389 B2
(45) Date of Patent: Feb. 21, 2017

(54) IMPACT AND EXPLOSIVE FORCE MINIMIZATION STRUCTURES

(71) Applicant: KineticShield, Inc., Doylestown, PA (US)

(72) Inventors: Thomas E. Twardowski, Morrisville, PA (US); Alan Ira Faden, Baltimore, MD (US); Christopher M. Pastore, Maple Glen, PA (US); Thomas M. Isaacson, Huntingtown, MD (US)

(73) Assignee: KineticShield, Inc., Doylestown, PA (US)

( * ) Notice: Subject to any disclaimer, the term of this patent is extended or adjusted under 35 U.S.C. 154(b) by 152 days.

(21) Appl. No.: 14/562,242

(22) Filed: Dec. 5, 2014

(65) Prior Publication Data

US 2016/0227867 A1 Aug. 11, 2016

Related U.S. Application Data

(63) Continuation-in-part of application No. 13/267,519, filed on Oct. 6, 2011, now abandoned, and a
(Continued)

(51) Int. Cl.
*A43B 21/26* (2006.01)
*A42B 3/06* (2006.01)
(Continued)

(52) U.S. Cl.
CPC .............. *A42B 3/063* (2013.01); *A42B 3/064* (2013.01); *B32B 1/00* (2013.01); *B32B 5/16* (2013.01);
(Continued)

(58) Field of Classification Search
CPC ........... Y10T 428/24; Y10T 428/24562; Y10T 428/24661; Y10T 428/24983; Y10T 428/24992; Y10T 428/25; Y10T 428/252; A44B 18/0076; B29L 2031/729; B29C 33/106
(Continued)

(56) References Cited

U.S. PATENT DOCUMENTS 3,994,021 A * 11/1976 Villari .................... A42B 3/125
2/413
5,815,846 A 10/1998 Calonge
(Continued)

FOREIGN PATENT DOCUMENTS

WO WO 2008101138 8/2008
WO WO 2010/019609 2/2010

OTHER PUBLICATIONS

NCSU Dept. of Chemistry-Lecture Demonstrations, "Slime—Polyvinyl Alcohol and Borax," Web archive dated Jun. 25, 2010.*
(Continued)

*Primary Examiner* — Aaron Austin
*Assistant Examiner* — Laura Figg

(57) ABSTRACT

A helmet including an insert provides the ability of including a highly energy absorbing feature within the insert. The insert includes a structure such as a Bingham plastic which, upon impact, absorbs the energy of the impact by converting from a solid to a liquid. Other energy absorbing features are contemplated. The energy absorption process occurs in one aspect in a nonreversible manner such that once a high enough level impact occurs on the insert, it must be replaced within the helmet. The insert has a fastener which enables it to be replaceable. In this manner, a highly absorbing feature of a helmet can be provided to reduce concussions while not requiring the complete replacement of a helmet.

13 Claims, 13 Drawing Sheets

Related U.S. Application Data continuation-in-part of application No. 13/267,551, filed on Oct. 6, 2011, now Pat. No. 8,927,088, and a continuation-in-part of application No. 13/267,590, filed on Oct. 6, 2011, and a continuation-in-part of application No. 13/267,604, filed on Oct. 6, 2011, and a continuation-in-part of application No. 14/139,012, filed on Dec. 23, 2013, which is a continuation-in-part of application No. 13/267,604, filed on Oct. 6, 2011.

(60) Provisional application No. 61/912,343, filed on Dec. 5, 2013, provisional application No. 62/047,976, filed on Sep. 9, 2014, provisional application No. 62/016,337, filed on Jun. 24, 2014, provisional application No. 61/442,469, filed on Feb. 14, 2011.

(51) Int. Cl.
| | |
|---|---|
| *B32B 5/16* | (2006.01) |
| *B32B 5/22* | (2006.01) |
| *B32B 5/30* | (2006.01) |
| *B32B 7/02* | (2006.01) |
| *B32B 1/00* | (2006.01) |
| *F41H 1/04* | (2006.01) |
| *F41H 1/08* | (2006.01) |
| *F41H 5/007* | (2006.01) |
| *F41H 5/04* | (2006.01) |
| *C08L 23/02* | (2006.01) |

(52) U.S. Cl.
CPC . *B32B 5/22* (2013.01); *B32B 5/30* (2013.01); *B32B 7/02* (2013.01); *F41H 1/04* (2013.01); *F41H 1/08* (2013.01); *F41H 5/007* (2013.01); *F41H 5/0428* (2013.01); *F41H 5/0492* (2013.01); *B32B 2260/025* (2013.01); *B32B 2260/046* (2013.01); *B32B 2262/10* (2013.01); *B32B 2264/10* (2013.01); *B32B 2264/101* (2013.01); *B32B 2264/107* (2013.01); *B32B 2264/12* (2013.01); *B32B 2307/56* (2013.01); *B32B 2419/00* (2013.01); *B32B 2437/04* (2013.01); *B32B 2571/00* (2013.01); *B32B 2605/00* (2013.01); *C08L 23/02* (2013.01); *Y10T 428/24* (2015.01); *Y10T 428/24512* (2015.01); *Y10T 428/24562* (2015.01); *Y10T 428/24612* (2015.01); *Y10T 428/24661* (2015.01); *Y10T 428/24983* (2015.01); *Y10T 428/24992* (2015.01); *Y10T 428/25* (2015.01); *Y10T 428/252* (2015.01); *Y10T 428/31504* (2015.04); *Y10T 428/31678* (2015.04)

(58) Field of Classification Search
USPC .......................................................... 428/100
See application file for complete search history.

(56) References Cited

U.S. PATENT DOCUMENTS

| | | | |
|---|---|---|---|
| 6,012,178 | A | 1/2000 | Schuster et al. |
| 6,682,128 | B2 | 1/2004 | Carroll et al. |
| 2003/0209641 | A1* | 11/2003 | Cooke ............... G05G 1/62 248/118 |
| 2004/0117896 | A1 | 6/2004 | Madey et al. |
| 2004/0168246 | A1 | 9/2004 | Phillips |
| 2005/0058822 | A1* | 3/2005 | Ittel ................... B32B 27/12 428/304.4 |
| 2005/0217767 | A1 | 10/2005 | Barvosa-Carter et al. |
| 2006/0059605 | A1 | 3/2006 | Ferrara |
| 2006/0059606 | A1 | 3/2006 | Ferrara |
| 2006/0073329 | A1 | 4/2006 | Boyce et al. |
| 2006/0269738 | A1 | 11/2006 | Kimberly |
| 2007/0107778 | A1 | 5/2007 | Bettin et al. |
| 2008/0028499 | A1 | 2/2008 | Skottheim et al. |
| 2009/0266663 | A1 | 10/2009 | Lin |
| 2009/0300949 | A1* | 12/2009 | Frederick ........... A43B 13/189 36/35 R |
| 2010/0229271 | A1 | 9/2010 | Marissen et al. |
| 2011/0212320 | A1 | 9/2011 | Greenhill et al. |
| 2014/0235781 | A1 | 8/2014 | Bower et al. |

OTHER PUBLICATIONS

NCSU Department of Chemistry "Slime Polyvinyl Alcohol with Borax" Pub date Jun. 25, 2010.*
Halley, Jim; USAToday "Helmet covers catching on, but many scientists aren't swayed" Publication date Aug. 9, 2012 URL: http://usatoday30.usatoday.com/sports/preps/football/story/2012-08-06/Helmet-cover-catching-on-but-scientists-arent-sure/56920646/1.*
http://www.oxforddictionaries.com/definition/american_english-thesaurus/discrete (2014).
3M, retrieved Feb. 8, 2013.
Azom.com (http://www.azom.com/article.aspx?ArticleID=764), retrieved Jul. 18, 2013.

* cited by examiner

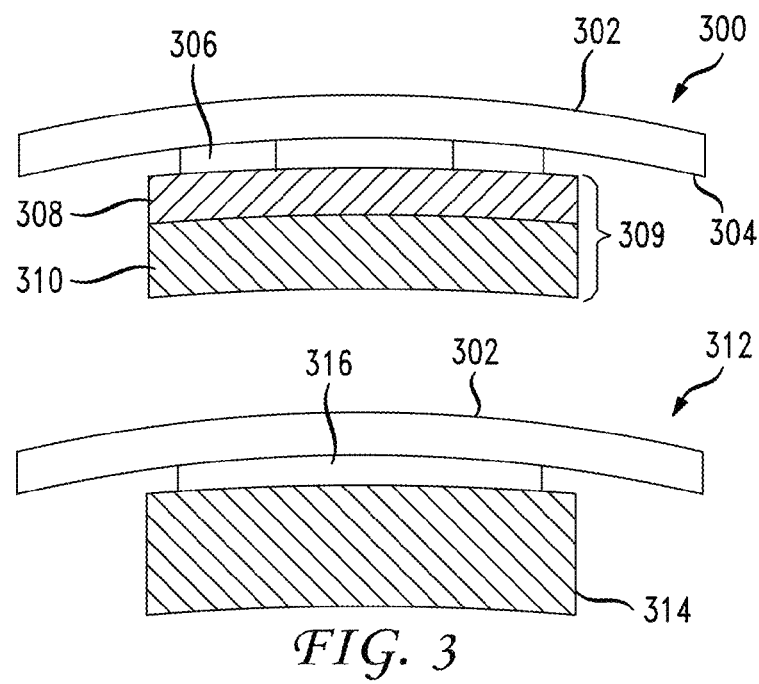
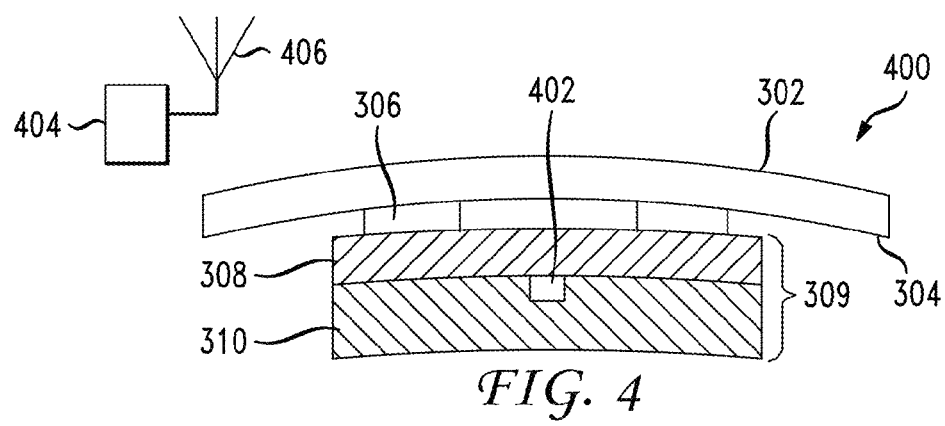
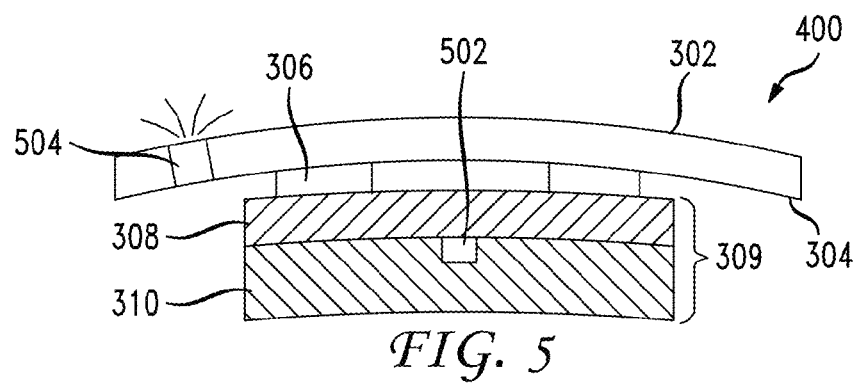

IMPACT AND EXPLOSIVE FORCE MINIMIZATION STRUCTURES

PRIORITY INFORMATION

This application claims priority to U.S. Provisional Patent Application No. 61/912,343, filed 5 Dec. 2013, U.S. Provisional Patent Application No. 62/047,976, filed 9 Sep. 2014, and U.S. Provisional Patent Application No. 62/016,337, filed 24 Jun. 2014. This application is a continuation-in-part of U.S. Non-Provisional patent application Ser. No. 13/267,519, filed 6 Oct. 2011, which claims priority to U.S. Provisional Patent Application No. 61/442,469, filed 14 Feb. 2011. This application is a continuation-in-part of U.S. Non-Provisional patent application Ser. No. 13/267,551, filed 6 Oct. 2011, which claims priority to U.S. Provisional Patent Application No. 61/442,469, filed 14 Feb. 2011. This application is a continuation-in-part of U.S. Non-Provisional patent application Ser. No. 13/267,590, filed 6 Oct. 2011, which claims priority to U.S. Provisional Patent Application No. 61/442,469, filed 14 Feb. 2011. This application is a continuation-in-part of U.S. Non-Provisional patent application Ser. No. 13/267,604, filed 6 Oct. 2011, which claims priority to U.S. Provisional Patent Application No. 61/442,469, filed 14 Feb. 2011. This application is a continuation-in-part of U.S. Non-Provisional patent application Ser. No. 14/139,012, filed 23 Dec. 2013, which is a continuation-in-part of Ser. No. 13/267,604, filed 6 Oct. 2011, which claims priority to U.S. Provisional Patent Application No. 61/442,469, filed 14 Feb. 2011, the contents of which applications are herein incorporated by reference in their entirety.

BACKGROUND

1. Technical Field

The present disclosure relates to impact minimization structures such as helmets, blast walls, protective clothing, helmets, vehicle protection and so forth. The structures incorporate in various methods and structures that use of Bingham plastics, low modulus rubbers, auxetic and structural textiles, incorporated into dissipative and/or sequentially dissipative devices and/or other mechanisms and materials to protect individuals and structures from percussive forces and bludgeoning damage.

2. Introduction

Most protective equipment is designed for protection against penetrating force and piercing damage. Armors act to blunt penetrating force, thus preventing catastrophic piercing damage. Unfortunately, many common threats to individuals and structures come from percussive (compression wave) force. In contrast with penetrating force which rapidly transfers high energy to create focused, piercing damage, percussive impacts transfer large quantities of total energy from lower energy waves at a relatively long rate of transfer resulting in accumulated bludgeoning damage. There is currently a need for improved protective technology targeted to percussive impact and dissipating bludgeoning damage. For example, helmets are used by football players, bike riders, skaters, military applications, and so forth. However, the rate of concussion injury is still high. Similarly, other protective gear is used in many different areas. Military personnel and vehicles need improved protection against impacts of various kinds. It is desirable to improve percussive damage protection technology.

Helmets and other armors are designed to reduce individual damage. Piercing damage is a common result of a transmission of penetrating force, with high peak energy delivered rapidly to a small area. The results of penetrating force are slicing injuries. Reductions in penetrating force can be generally achieved by designs that widen the impact zone to prevent penetration, including those of the technologies described herein. Bludgeoning damage is a common result of a transmitting percussive force, with low peak energy delivered slowly to a large area. The results of percussive force are crushing damage to tissue, concussions or other injuries affecting a broad area. Reductions in percussive force are not amenable to traditional design, and require special attention through designs that dissipate the energy using the described technology.

In other cases, an impact device, in particular of a percussive design, might be also placed near a building and there is a need to protect the building and occupants from the damage caused by the blast, in particular of a bludgeoning type. There also is a need for structures using the described technologies to help prevent or reduce the effects of a blast on buildings or other object.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure includes various embodiments related to structures for protecting individuals from different kinds of impact. One embodiment applies to a helmet used for football. Other helmet embodiments cover bike helmets, motorcycle helmets, or other kinds of helmets. Other personal protective armor embodiments cover body armor. Other protective armor embodiments cover moving vehicles. Another embodiment applies to a tent wall used to protect a building. A container or a blast blanket can also be used with the principles disclosed herein. Other embodiments encompass blast walls built into buildings, or other structures. Other embodiments encompass flexible walls to protect vehicles. Generally, the principles disclosed herein describe the uses of: a Bingham plastic or similar material that convert from a solid to a liquid upon experiencing a threshold force; moderate modulus rubber that displace laterally upon experiencing a threshold force; textiles that rupture upon experiencing a threshold force; foams that expand upon experiencing a threshold force. These embodiments include the use of such materials individually, in stacks and/or in combination to optimize dissipation of low peak energy, broadly distributed energetic impacts.

A first embodiment includes a helmet having a shell with an inner surface. A first component includes a fastener attached to the inner surface. The first component can be part of a fastener, a snap, or Velcro. An insert is made at least in part from a plastic and has a second component of the fastener attached to the plastic. The second component can be the opposing component of a snap, Velcro, or other fastening mechanism. The insert is removable by separating a connection between the first component and the second component. The plastic can be, for example, a Bingham Plastic that changes from a solid to a liquid at a shear threshold such as particular force being applied to the helmet. Upon the force being applied, the plastic converts to a liquid and absorbs at least some of the energy of the force or the impact. This reduces the amount of energy transferred to the head of the individual, thus reducing the probability of a concussion or other injury.

In the first embodiment, the Bingham plastic can be a mixture of polyvinyl alcohol, water and borax at concentrations to provide target threshold energy. The plastic can include, for example, between 2% and 20% of hydrolyzed polyvinyl alcohol and between 0.5 and 8% borax. In other embodiments, the Bingham plastic can be any mixture of a plastic, e.g. polyacrylic acid, guar gum water soluble plastics, polyacrylate and polynitrile hydrocarbon soluble plastics, capable of inter- and intra-chain interactions, dissolved in an appropriate miscible solvent, with temporary or permanent cross-linking chemistry or additive agents to provide target threshold energy.

In a second embodiment, the plastic can also be, for example, a graded foam that expands laterally rather than compressing under applied load. Upon the force being applied, the plastic displaces laterally to absorb energy without displacement of the inner surface of the insert relative to the surface of the head as significantly or at all. This reduces the amount of energy transferred to the head of the individual, thus reducing the probability of injury. The structure of the graded foam can be triangular, circular, rectangular, or any other shape.

In the second embodiment, the graded foam can be a graded combination of polyurethane foams with different mechanical modulus to provide a target range of deformation threshold energies. In other embodiments the target range can be achieved using polyurethanes of different chemical or physical densities. In other embodiments, the target range can be achieved using polyurethanes with different physical or chemical densities or modulus combined with nanoparticulates and/or microparticulates of silica. In other embodiments the particulates are other ceramic, metal or plastics. In other embodiments, the plastic can be other flexible foam material, e.g. foamed styrene butadiene rubbers, styrene-butadiene-styrene rubber, or co-polyesters, co-polyamides, or co-polyacrylates.

In a third embodiment, the plastic can also be, for example, a rubber with a low modulus that displaces laterally at a shear threshold. Upon the force being applied the material displaces laterally and slowing the transfer of shear energy rather than allowing shearing energy to be transferred rapidly to the surface below. This reduces the peak energy transferred to the head of the individual, thus reducing the probability of injury.

In the third embodiment, the rubber can be a Plastisol or plasticized polyvinyl chloride plastic. In other embodiments the rubbery elastic plastic can be any type of plastic that can be formulated or chemically manipulated to produce a target shear modulus, e.g. Kraton or other styrene/butadiene copolymers, natural rubber and polyisoprene, and polysilane (silicone) rubber. In another embodiment, the rubber can be comprised of layers with differing shear moduli. The rubber can be utilized on an insert, on an inner surface of a helmet, wall, blast blanket or other structure, or on an outer surface of the helmet, wall, blast blanket or other structure.

In a fourth embodiment, the plastic can be a cotton fabric layer that is structured such that the yarn will break on the application of a shear threshold. Upon the force being applied the yarn tears and ruptures so as to consume energy in breaking. This reduces the peak energy transferred to the surface of the structure or individual, thus reducing the probability of damage or injury. In another embodiment the yarn can be comprised of an appropriate chemistry and diameter to have a target failure threshold, e.g. polyester, nylon, or glass.

In fifth embodiment, the fabric layer can be a helical-auxetic, yarn that becomes thicker as it extends and prevents percussive force from penetrating deeper as the fabric structure becomes more porous. In another embodiment, the auxetic yarn can have different structure or chemistry that causes the yarn to become thicker as it extends when under tension. In a sixth embodiment, the fabric layer can be a textile with loops of cotton yarn woven in such a way as to form 1 inch loops that are connected with yarns of a lower modulus such that under percussive force and the resulting extension will break and allow the fabric to expand before breaking again. In another embodiment the fabric layer can use loose weaves that take a zig-zag or other pattern that allows expansion.

In a seventh embodiment the layer can be a plate composed of one or more types combinations of the Bingham plastic, rubbery elastic plastic or foam plastics of the first, second and third embodiments or other embodiments and arranged in a fish-scale pattern. In another embodiment the plates overlap in other patterns. In another embodiment, the plates can be arranged such that the plates are contiguous and butt against each other. In another embodiment the plates can be arranged that the plates are non-contiguous and are placed so as to optimize the interaction with an impacting force. In another embodiment the textile can be an ordinary textile.

In an eighth embodiment, the insert is removable. A removable insert for use in a helmet includes a plastic that changes from a solid to a liquid at a shear threshold. A first component of a faster is attached to the plastic. The first component of the fastener connects to a second component of the fastener, and the second component is attached to the helmet. The insert can one or more layers, each having a different structure as disclosed herein. For example, one layer may be of triangular graded foam, with another layer including a plastisol, and a third layer including a Bingham Plastic.

In a ninth embodiment, a plastisol plastic or other low to moderate rubber material layer of embodiment three is attached to the outer surface of the helmet. In this embodiment, a helmet includes a shell having an outer surface and a plastisol layer attached to a portion of the outer surface. The plastisol plastic layer can also be positioned on an inner surface of the helmet or as part of a removable insert.

In another embodiment, a removable insert for use in a helmet, wherein the removable insert includes a first layer having first plastic that changes from a solid to a liquid at a shear threshold, the first plastic being a first color, the first layer having first component of a fastener attached thereto. The first component of the fastener connects to a second component of the fastener, the second component being attached to an interior surface of the helmet. A second layer has a second plastic that changes from a solid to a liquid at the shear threshold, the second plastic being a second color, the second layer being adjacent to the first layer. Upon the removable insert being impacted at the shear threshold, the first layer mixes with the second layer to reveal the first color. In this manner, if an impact is experienced that is at or above the shear threshold, the user can look at the insert. If, for example, the first color is red and the second color is white, then the insert would have some red showing which would indicate that the insert has absorbed the impact and should be replaced.

In another embodiment, a removable insert for use in a helmet, wherein the removable insert includes a first layer having first rubbery plastic that displaces at a shear threshold, the first plastic being a first color, the first layer having first component of a fastener attached thereto. The first component of the fastener connects to a second component of the fastener, the second component being attached to an interior surface of the helmet. A second layer has a second plastic that deforms at the shear threshold, the second plastic being a second color, the second layer being adjacent to the first layer. Upon the removable insert being impacted at the shear threshold, the second layer deforms to expose the first layer to reveal the first color. In this manner, if an impact is experienced that is at or above the shear threshold that damages the first layer, the user can look at the insert. If, for example, the first color is red and the second color is white, then the insert would have some red showing which would indicate that the insert has absorbed the impact and should be replaced.

The present disclosure also relates to a cartridge or insert that can be formed to fit within a helmet or other larger enclosure. The cartridge preferably is structured such that it can be positioned within a helmet in a location that is most likely to receive a hard hit. For example, typically, the forehead area of a helmet is the area that will receive the most force and the most common area where hits occur on a football player's helmet. The present disclosure relates to providing a removable cartridge which covers this high impact area and which can include an improved structure for absorbing the energy of an impact. For example, in one embodiment, Bingham plastics are used within the cartridge which can dissipate the energy received from an impact by converting the Bingham plastic from a solid to a viscous fluid. Bingham plastic represents a viscoplastic material that in a natural state is a rigid body but at a particular level of stress can convert and flow into a viscous fluid.

The present disclosure also relates to a cartridge or attachment that can be formed on the external surface or a helmet or other smaller enclosure. The rest of the disclosure is identical to that described above.

In a case where an impact causes a Bingham plastic to convert from a solid to a fluid, the change may be irreversible. Accordingly, the basic embodiment of this disclosure includes a cartridge having Bingham plastic such that when an impact of a certain level of stress occurs on the cartridge, the Bingham plastic converts from a body into a viscous or Newtonian fluid, and causes the plastic to flow into a reservoir or some other location. At this point, the value of the cartridge is reduced because the Bingham plastic has become distorted, and therefore, the cartridge must be replaced. The present disclosure relates to systems and methods related to such cartridges or inserts.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates several variations of the structure of the inserts;
FIG. 4 illustrates an embodiment including an electronic component for transmitting a signal associated with an impact to a remote device;
FIG. 5 illustrates an embodiment including an electronic component that communicates with another electronic component within the helmet for signaling an impact.

DETAILED DESCRIPTION

Figure 1:
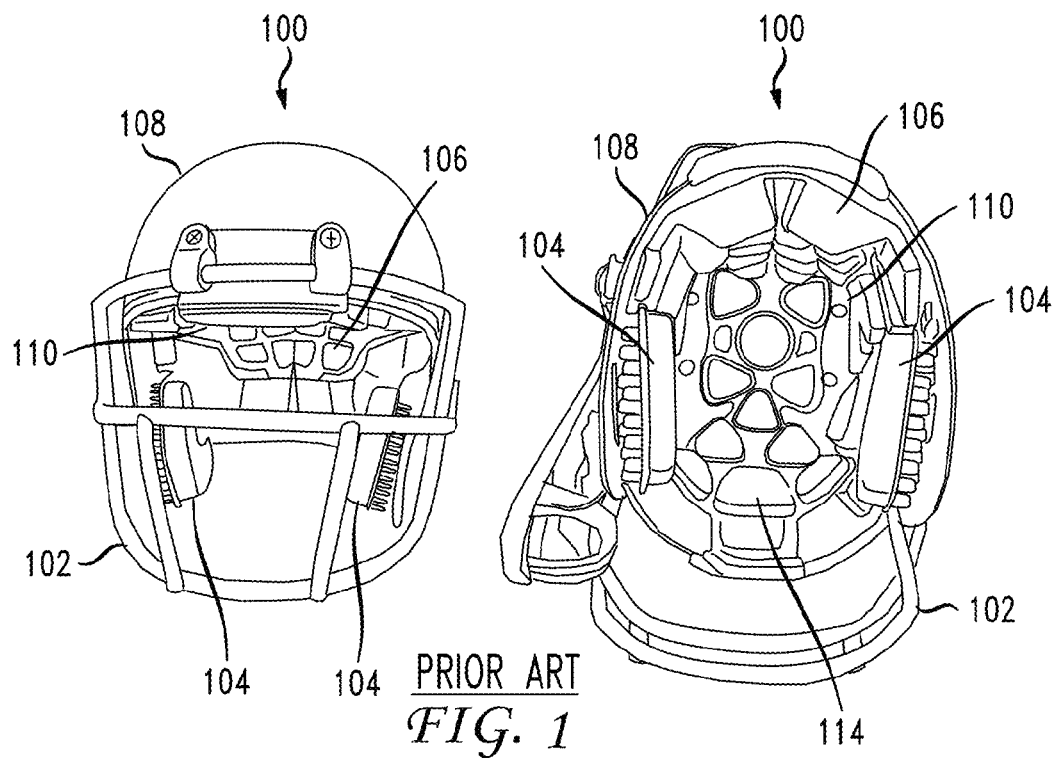
FIG. 1 illustrates a prior art football helmet.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The general focus of this disclosure is impact resistant/absorbing structures. These structures can have various forms. Disclosed herein are several embodiments of impact resistant/absorbing structures ranging from helmet technologies to blast surface layers that can be constructed around an explosive device to contain the explosion or as a wall placed near an explosive device to protect individuals or materials on the other side of the wall from the effects of an explosion. The principles disclosed herein describe the uses of: (1) a Bingham plastic or similar material that convert from a solid to a liquid upon experiencing a threshold force; moderate or low modulus rubber that displace laterally upon experiencing a threshold force; (2) plastisol materials; (3) textiles that rupture upon experiencing a threshold force; and (4) foams and foam structures that expand upon experiencing a threshold force. These embodiments include the use of such materials individually, in stacks and/or in combination, to improve the dissipation of low peak energy, broadly distributed energetic impacts.

The disclosure begins with helmet technology and various components related to helmet technology such as the use of plastisols (or other low to moderate rubber material) and Bingham Plastics, including fiber reinforcement, to reduce injury such as concussions. Following the discussion on various helmet embodiments, this disclosure will focus on blast containment layers associated with walls and other structures.

The helmet embodiment includes several separate aspects for reducing the impact on the user. The first is use of Bingham Plastics made from a solution of vinyl alcohol (PVA) and water and cross-linked with sodium tetraborate (borax). Natural and synthetic fibers can also be combined with the Bingham Plastic to increase the effectiveness. The Bingham Plastics are preferably used on inserts or cartridges that are removable positioned inside the helmet or as part of the surface of the helmet. Example lengths of the natural or synthetic fibers include 0.5-5 cm in length. The fibers included in the plastic can also include various length of fibers and a combination of both natural and synthetic. For example, the plastic could contain 20% natural fiber with lengths at 1-2 cm and 80% synthetic fibers having lengths between 2-4 cm. Any combination of percentages and lengths are contemplated herein.

The Bingham plastic can be any mixture of a plastic, e.g. polyacrylic acid, guar gum water soluble plastics, polyacrylate and polynitrile hydrocarbon soluble plastics, capable of inter- and intra-chain interactions, dissolved in an appropriate miscible solvent, with temporary or permanent cross-linking chemistry or additive agents to provide target threshold energy.

In another aspect, plastisols are used as an additional layer on the outer surface of the helmet to reduce the effect of an impact. The plastisol layer can have a single or multiple layer configurations. The discussion below regarding the helmet embodiment covers both aspects of protection.

Discussion of the Study of Bingham Plastics

Next the disclosure discusses various studies and information related to the development of Bingham Plastics for the purposes of preventing concussions or other injuries.

The following Chart 1 illustrates example mixtures with respect to how to make the required Bingham plastics (PVA/borax) samples for the energy dissipation gels using 99% hydrolyzed Poly(vinyl alcohol) (PVA), sodium tetraborate (Borax) and water.

CHART 1

| PVA (%) | Borax (%) | ID |
| --- | --- | --- |
| 4 | 2 and 8 | 4/2 or 4/8 |
| 6 | 8 | 6/8 |
| 12 | 2 and 8 | 12/2 or 12/8 |
| 16 | 2 and 8 | 16/2 or 16/8 |

An example procedure of creating the Bingham plastic is to fill a container with water and add the appropriate amount of PVA of the volume of water in the container (e.g. for 1000 grams of water, add 40 grams of PVA to make a 4% solution) to create or yield a solution. The solution can be baked at 250 F until the solution appears clear (non-cloudy). Note that depending on the volume and concentration of the solution, the bake time will the longer.

There may be a dry skin-like film on the surface of some of the solutions after about an hour, depending on the volume. This can be removed and the heating continued until the solution clears. Borax can then be poured into the PVA solution and mixed. The greater the concentrations of PVA and borax, the more difficult it may be to stir. This step yields a mixture.

The mixture can be heated in an oven at 250 F. Stirring the mixture at about 5 minutes intervals yields a gel-like substance. Higher concentrated PVA solution can take a longer time in the oven to completely dissolve. Also the larger the volume of the solution is, the longer it will take to completely dissolve.

The gel-like substance can be packed into plastic bags and sealed air tight. Exposure of the gel to the atmosphere will cause the PVA and Borax mixtures to dry out and lose desirable properties, thus is preferably avoided by sealing in an air tight package. This process yields the Bingham Plastic layer associated with an insert in the helmet. The plastic includes between 2% and 20% of hydrolyzed polyvinyl alcohol and between 0.5 and 8% borax.

Prototype helmets were fabricated to demonstrate the materials in place on an actual football helmet. Standard football helmets were purchased as the base system. Several Schutt XP Hybrid helmets were procured. The interior padding of the Schutt Helmet was replaced. Bingham plastics as described above can be prepared and used to replace the standard foam inserts. There are two basic standard foam insert configurations—the foam itself and the white pad/support systems.

The foam is about 3 cm thick and is attached to the interior of the helmet using velcro fasteners. To replace the foam inserts, 16/8 Bingham plastics were produced and formed to shape in small polyethylene packages to approximate the original shape of the foam inserts. Remember that 16/8 means the percentage of PVA and Borax. These do not have to be exact percentages. For example, a range of PVA can be between 1 and 30% and the percent of Borax can be between 0.5 and 20. Any combination of these percentages is contemplated within this disclosure. The air tight packets containing the mixture were adhered to a felt backing. The backing can attach to the existing Velcro fasteners in the helmet.

Figure 2:
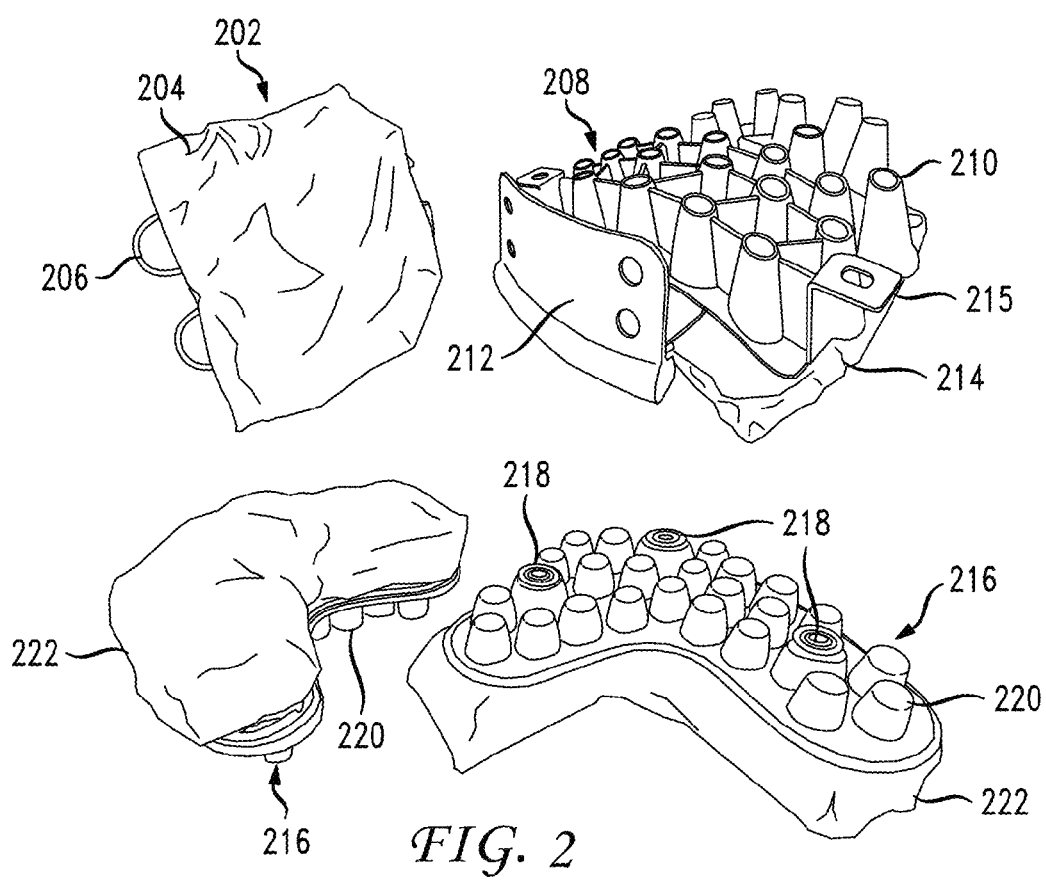
FIG. 2 illustrates various inserts according to an embodiment of this disclosure.

The white pad/support system from the standard helmet includes, by way of example and not limited to a particular thickness, a 1 cm thick foam contained in a vinyl wrapper and supported by a plastic pyramid crush system. The foam is very soft as it comes in contact with the ears. A 4/2 Bingham plastic was put into an airtight polyethylene packet and attached to the existing support system. The systems (inserts) snap into place in the helmet as is shown in FIG. 2. The choice of the 4/2 balance of PVA and Borax was to keep the very low compressive stiffness of the original foam. Using this system, it is possible to switch the prototype helmet from original padding to the substitute material with ease.

Impact testing was performed on the samples having Bingham Plastic inserts for both perpendicular compressive impact at 100 Joules and 33 Joules, and oblique shear impact at 100 Joules. Samples of Bingham plastics were produced using a solution of poly(vinyl alcohol) (PVA) and water, cross-linked using sodium tetraborate (borax). In some cases, the result was plastics having gel-like properties as described when the Bingham Plastic is prepared by the process described above. The materials were produced from different concentrations of 99% hydrolyzed PVA, at concentrations of 4%, 6%, 12% and 16% by weight. Borax was added to these solutions at weight fractions of 2%, 4% and 8% to get different stiffness materials with different shear yield thresholds. Different concentrations of PVA (reported as weight percent in water) were produced, and for the different concentrations, different amounts of borax were added (reported as weight percent of water). Seven different configurations of PVA/Borax were produced and tested at different thicknesses. Small quantities of pigment were added to the various mixtures to make it easy to visually recognize the sample chemistry.

The materials were stored in air tight plastic bags (other materials could be used as well) to minimize drying of the materials, and were tested while in these bags. The bags fit loosely in the testing. It is contemplated that in an embodiment of the disclosure that the bags could either be loosely fit or tightly fit around the plastic such that the bags conform closely to the form of the plastic.

In one aspect, the bags or containers for the Bingham plastics can be of any type of material that is appropriate for holding the Bingham plastic in place and for preventing flow of the Bingham plastic upon impact. In another aspect, a bag or outer container could have holes or openings or perforations that open at a threshold load which enable fluid to actually flow out of the bag upon impact. The perforation can be circular, or linear, or any other shape that can enable the container to be air tight in normal use, but at a threshold value, the perforation would tear and create an opening out of which the plastic in its liquid state would exude. These containers could be composed of woven, knitted or non-woven textiles or made of a continuous, perforated film. Other ranges are contemplated as well for the percentages disclosed herein. Other types of Bingham plastic can be contemplated, for example those composed of silicone oils, particles and polymers.

The various materials were subject to compression testing and impact testing to determine their suitability for use. In one aspect, short fibers (1-2 cm) can be combined with 4/2 PVA/Borax mixtures at a 5% weight fraction. Both natural fiber (jute) and synthetic fiber (PET) were added and the resulting samples were tested for 100 Joule impact response. The energy absorption was comparable to that of the 16/8 samples. The 16/8 samples are the preferred embodiment. The natural fiber samples performed slightly better than the synthetic fiber samples. The use of natural or synthetic fibers offers an inexpensive route to providing the desired energy absorbing properties. The shear modulus and the compression modulus was tested and determined for the various samples. Other types of fillers are contemplated, including density reducing materials such as microscopic glass or plastic balloons or foamed Bingham Plastics. Any combination of ratios of percentages of PVA and Borax, in connection with either natural or synthetic fibers of various lengths, is contemplated.

Helmet prototypes were produced with removable inserts associated with Bingham Plastics. A test was performed of the potential energy based on an impact towards a strike plate holding the sample under investigation. The potential energy of the strike plate after impact was measured and the difference between the two was a measure of the absorbed energy by the material receiving the strike. The test was performed initially with an approximately 3 kg strike plate and then again with an 8 kg strike plate.

The compressive stress response was measured at relatively low load levels (up to 50 kPa for the stiffer materials, up to 7 kPa for the softer materials) to extract the initial modulus and general behavior of the various Bingham plastics. Additionally, foam elements extracted from football helmets were tested for comparison purposes.

The 4% PVA samples were tested in compression and showed a high sensitivity to the amount of borax. The compressive stiffness increased with more borax. Different elements of the football helmet were removed. In the interior of the helmet there were three different types of padding. The first material is a skinned foam (single piece of foam with hardened exterior), the ear pads and the top of the helmet are different types of foam in a plastic envelope. The foam in the ear pad units consists of a two-layer foam with a lower density foam on the ear side and a higher density foam on the helmet side. The top pad has a low-density foam.

Impact testing was performed by releasing a 5.5 kg sphere with approximately 35 or 100 Joules of potential energy towards a strike plate holding the sample under investigation. The potential energy of the strike plate after impact was measured and the difference between the two a measure of the absorbed energy by the material receiving the strike.

The tests were performed with an 8.3 kg strike plate. A data logging accelerometer was attached to the strike plate. The acceleration of the plate due to impact was recorded. This was integrated to determine the velocity as a function of time for the impact event, which typically lasted for 0.02 to 0.04 seconds. The velocity of the strike plates after impact was calculated and the kinetic energy of the plate determined ($\frac{1}{2} mv^2$).

Of interest is the energy dissipated by the target. This was calculated by comparing the kinetic energy of the target without any sample on it to the kinetic energy when the samples are in place. The difference between the two represents the dissipation of energy from the samples.

In addition to using the accelerometer, high-speed video was captured of the events and the potential energy ($mg\Delta h$) in the strike plate was measured at the peak of recoil.

Furthermore, the potential energy lost due to the support system was measured and added back to the potential energy calculation from the video capture. The potential energy calculated from video measurements was compared to the kinetic energy calculations from the accelerometer. The testing shows a correlation between the potential energy measurement from video capture and the kinetic energy measured from the accelerometer. Samples were tested at three different thickness: 1, 2, and 3 centimeters. They were tested at two nominal impact levels: 35 Joules and 100 Joules. The effects of different parameters can thus be extracted.

Not surprisingly, increasing the thickness of the sample increases the energy dissipation and reduces the peak acceleration at impact. The peak acceleration was studied against part thickness for 100 Joule impact. As the part thickness increases, the peak acceleration decreases.

Looking at general trends with regards to chemistry, the effect of the amount of PVA and Borax in the Bingham plastic on the amount of energy dissipated during impact was evaluated. For low energy impact (35 J) there is a slight increase in energy dissipation with increasing PVA for low Borax content (2%) and a general decrease in energy dissipation with increasing PVA for high Borax content (8%).

When considering the higher energy impact (100 J), the trend is for increasing energy dissipation with increasing PVA concentration regardless of the Borax content. The first pads from the Schutt helmet were identified as the baseline material to meet or exceed in performance. Because of the effect of thickness as noted above, and the need for proper helmet fit, 3 cm thickness was identified as the appropriate sample thickness to use for comparison purposes. However, as noted elsewhere in this disclosure, the thickness of any given insert can vary from a small thickness such as 5 mm to a larger thickness such as 5 cm, and even extend to thicknesses outside this range, such as less than 5 mm down to 1 mm and up to 10 cm.

In the study, the peak acceleration observed during impact for both 35 and 100 Joule tests. For example, the 3 cm thick results showed that better performance correlates with lower peak acceleration than the first pads from the Schutt helmet. At low energy impact, the 12/2, 12/8 and 16/2 samples have a lower peak acceleration than the first pads, while 16/8 is very close in comparison. At high energy impact the 12/2, 16/2 and 16/8 have lower peak acceleration than the first pads. 4/8 and 12/8 have very similar peak accelerations.

A similar comparison can be made with the dissipated energy. This is the energy that is absorbed by the sample and not transferred into mechanical energy of the strike plate. In this instance, the study looked for materials that have higher dissipated energy than the orange pads, indicating that the materials has dissipated energy rather than transferring it to the wearer of the helmet. The study showed that at a low energy (35 J) event, all of the samples except 16/8 dissipate more energy than the first pads. At higher energy, all of the samples except 6/2 dissipate more energy than the first pads.

Dissipated energy has been identified as the critical element associated with preventing concussions, and 100 Joules has been noted in the literature as a critical impact energy that results in concussions. A summary comparison is thus made showing how much more or less energy is dissipated by the Bingham plastics than the first pads. In this case, the study looked for higher values, indicating more dissipation, thus less energy getting through to the wearer. The important results of the study showed that the Bingham Plastic materials far surpass the energy absorption properties of the first pads from the Schutt helmet. In fact, the energy absorption of the Bingham Plastic is more than double in the case of 12/2 and 16/8, and close to double for 16/2. This study provides a sound basis for the improvement disclosed herein, namely the use of Bingham Plastics as part of the structure of a removable insert in a helmet that can provide improved protection against concussions than the standard foam padding.

As noted above, an additional and optional feature of the inserts is the use of fibers in the material. Two different sets of fibers were evaluated as reinforcement to Bingham plastics—natural fibers (jute) and synthetic fibers (PET). Fibers were cut to about 2-3 cm long and separated. These fibers were mixed into a 4% PVA solution and 2% Borax was added to this mixture to create a fiber reinforced Bingham plastic. It is contemplated that fibers of a range of 0.1 cm-5 cm be used. Fibers lengths below and above this range are contemplated as well. Addition of glass particles and hollow glass or plastic beads as reinforcement instead of or in addition to fiber is also contemplated.

The Bingham Plastics with the use of the inserted fibers were tested for energy absorption at 100 Joules impact and compared with the other Bingham plastics. The samples were 3 cm thick to be comparable with the foam padding. The peak acceleration observed during impact of the fiber reinforced samples ("Nat Fiber" and "PET") had relatively low peak accelerations, with the natural fiber reinforced samples being lower than the orange foam padding, and lower than all the Bingham plastics except 12/2 and 16/8.

The energy dissipated during a 100 Joule impact was also recorded for the various 3 cm thick samples. The PET reinforced sample performed quite well, about the same energy dissipation and the 12/2 samples and slightly lower than the 16/8. The natural fiber reinforced samples had the highest energy dissipation of all the materials tested in this project. In this regard, an insert having a Bingham Plastic with inserted natural fibers appears to result in better performance for a high impact event.

Example Helmets

FIG. 1 illustrates a prior art helmet 100 including basic known components. An outer shell 108 is typically made of a hard plastic. The shell 108 has an outer surface upon which is attached a facemask 102. The helmet 100 has an interior surface 110 to which is attached a variety of foam elements. Ear pads 104 are positioned near the wearer's ears. Other pads 106, 112, and 114 have various shapes and are positioned in different regions in the interior of the helmet for protecting the head from an impact. The deficiency of the standard helmet is that the padding is not sufficient to prevent concussions. What is needed is an improvement in helmet technology that reduces the number of concussions which is easily implementable in existing helmets. The solution disclosed herein is, in one embodiment, a replaceable insert that utilizes a different material than the standard foam and that will dissipate more energy from an impact, thus reducing the energy transfer to the head of the wearer. The principles disclosed herein can also apply to other helmets beyond football helmets, such as bike helmets, motorcycle helmets, etc. In some cases, the helmets themselves might be disposable (and thus not use separate inserts) after one impact that causes a change in the state of the Bingham plastic. The particular embodiment discussed next relates to a football helmet with removable and replaceable inserts.

FIG. 2 illustrates a variety of embodiments of inserts which can be used to replace respective foam pads 106, 112, 104, 114 in a football helmet. Feature 202 represents an interior view of a crush system insert, which, in one embodiment, can be approximately ½ cm thick. Other thicknesses are contemplated as well. Feature 204 is a Bingham plastic, with characteristics disclosed herein. The plastic is placed in for example a polyethylene packet and attached to a plastic pyramid crush system 206 as a support, which also includes fasteners to enable attachment to the interior surface 110 of a helmet 108. Other materials of construction of the packet are contemplated as well, including mylar/polyester, polypropylene, cellulose, polylactic acid, or any other appropriate package material. Insert 202 is designed to replace earpiece 104. The pyramid crush system 206, if viewed from the other side, would look similar to the crush system 210 shown in feature 208 of FIG. 2. The general structure of the Bingham plastic 204 can of course vary from what is shown in feature 202. The shape, thickness and particular properties of the Bingham plastic can also vary and be chosen based on any number of factors such as, but not limited to: head structure of the user, weight of the user, position the user plays in a football game, helmet size relative to head size of the user (i.e., a larger helmet may require a thicker insert 202), desirability of a level of protection, location of the head being protected, weight of the helmet, and so forth. For example, in once aspect, the thickness of crush system 206 can be adjusted as well as the thickness of layer 204 such that the overall thickness of insert 202 is 1 cm or 1 inch. In other words, the level of use of Bingham plastics in the layer 202 can be adjusted by making that layer thicker or thinner as desired with corresponding changes to the thickness of layer 206. Such adjustments can be made for each removable insert in the helmet 100.

Insert 208 shown in FIG. 2 includes a plastic pyramid crush system 210 and a Bingham plastic layer placed in a packet 214. The packet can be of any material. Another structure 212 is also a plastic structure that can be used to attach the insert 208 onto the helmet shell 108. As an example, insert 208 could replace foam padding 114 of the helmet 100. In this regard, feature 212 acts at least in part as a fastener to connect or fasten insert 208 into the helmet. Another fastener 215 is also shown. Insert 208 can be used for example in the position on the helmet shown as feature 114 in FIG. 1. Feature 114 is the padding that is attached to protect the center of the forehead of the wearer. A structure corresponding to feature 212 in FIG. 2 can be seen in the left helmet of FIG. 1, in the center and attaching a top bar of the facemask 102 to the helmet 100. The various structures and thickness of layers 210 and 214 of insert 208 can also be adjusted as with insert 202. For example, because this insert is positioned at a place on the helmet where significant impact occurs through tackling, the Bingham plastic layer 214 can be thicker and the crush system 210 might be thinner in order to provide improved protection.

FIG. 2 also shows another insert 216 with two different views, one from the top and one from the bottom. Insert 216 has fasteners 218 connected to a pyramid crush system 220 which is then attached to a Bingham plastic layer 222 placed into a polyethylene packet. This insert snaps into the helmet and can be used to replace foam inserts 112, 106 or 104.

The shape of the inserts is only meant to be exemplary as shall be seen. The overall thickness, the thickness of each individual layer of an insert, the positioning and structure of fasteners, the structure of the crush system layer, and so forth are all variable and different variations are contemplated. For example, the Bingham Plastic layer 204, 214, 222 shown in FIG. 2 could be structured such that there are holes in various portions of the layer, or the layer could be smooth or rough, even or uneven across the surfaces.

In one aspect, the removable insert can include one or more holes or perforations that enable the Bingham Plastic, upon experiencing an impact meeting or exceeding a threshold level and that causes the plastic to convert to a liquid, enables the liquid exudes out the hole or perforation. FIG. 3 illustrates several different examples of a cross sectional view. Feature 300 shows an outer shell 302 of a helmet having an inner surface 304 to which a fastener 306 connects the shell 300 to an insert 309 including a first layer 308 and a second layer 310. One layer is generally considered to be of a standard foam type layer and the other of layer 308, 310 is made from a Bingham Plastic. The layers 308, 310 are interchangeable. Fastener 306 can be any type of fastener. It is preferable that fastener 306 represent a fastener that enables the insert to be removable.

FIG. 3 further shows feature 312 with a different fastener 316 connecting the insert 314 to the inner surface 304. The insert 314 in this case is all made from Bingham plastic. In one embodiment, feature 316 represents a plastisol or other low to moderate rubber material that is positioned on the inner surface of the helmet 302. The plastisol layer 316 could double as a fastener to the removable insert. In this regard, the discussion herein about the plastisol layer adhered to the outer surface could also be applicable to the inner surface. The inner surface plastisol layer may or may not be used as an adhesive for a removable insert. The plastisol layer may be configured such that there is no other removable insert but the plastisol layer is positioned to touch the head of the user.

FIG. 4 illustrates a variation in which an electronic system is used to provide a signal indicating that the Bingham Plastic has changed conformation due to the change in state such that it is no longer effective. This would be applicable if an irreversible material was used. In feature 400, the layer 310 includes a detector and transmitter 402 which transmits a signal to a remote device 404 having an antenna 406 such that a person such as a coach or a parent can be notified of the potential for a concussion or other injury. Thus, whether it is through a gyroscope or a system of accelerometers that detects a large enough impact at or above a threshold value, or whether the detector 402 identifies when the Bingham Plastic has converted from a solid to a liquid, the detector/transmitter 402 would transmit a notification signal of that event. In that case, the user would remove the insert 309 and replace it with another insert before using the helmet again.

FIG. 5 illustrates another aspect of this disclosure in which the helmet 400 has attached to the inner surface 304 of the shell 302 an insert 309 with two layers 308,310. Embedded within one of the layers is a component 502 that can be mechanical or electrical. In an electrical embodiment, the component 502 detects whether the Bingham Plastic in layer 310 has changed state from a solid to a liquid to absorb an impact. If so, the component 502 communicates with another component 504 in the surface of the shell 302. Where these components are electrical, they could communicate via a wireless means such as BlueTooth or some other protocol. The component 504 provides a signal to the user that can be seen to indicate that the insert should be replaced. For example, a red LED light could turn on or a sound could be made to indicate and warn that the insert 309 should be replaced. There are other mechanisms as well disclosed below that provide for various means of warning.

In one type of device, the phase change is monitored by a change in capacitance. In another type of device, a change in phase causes a displacement of wires or other sensors that trigger the device.

Figure 6:
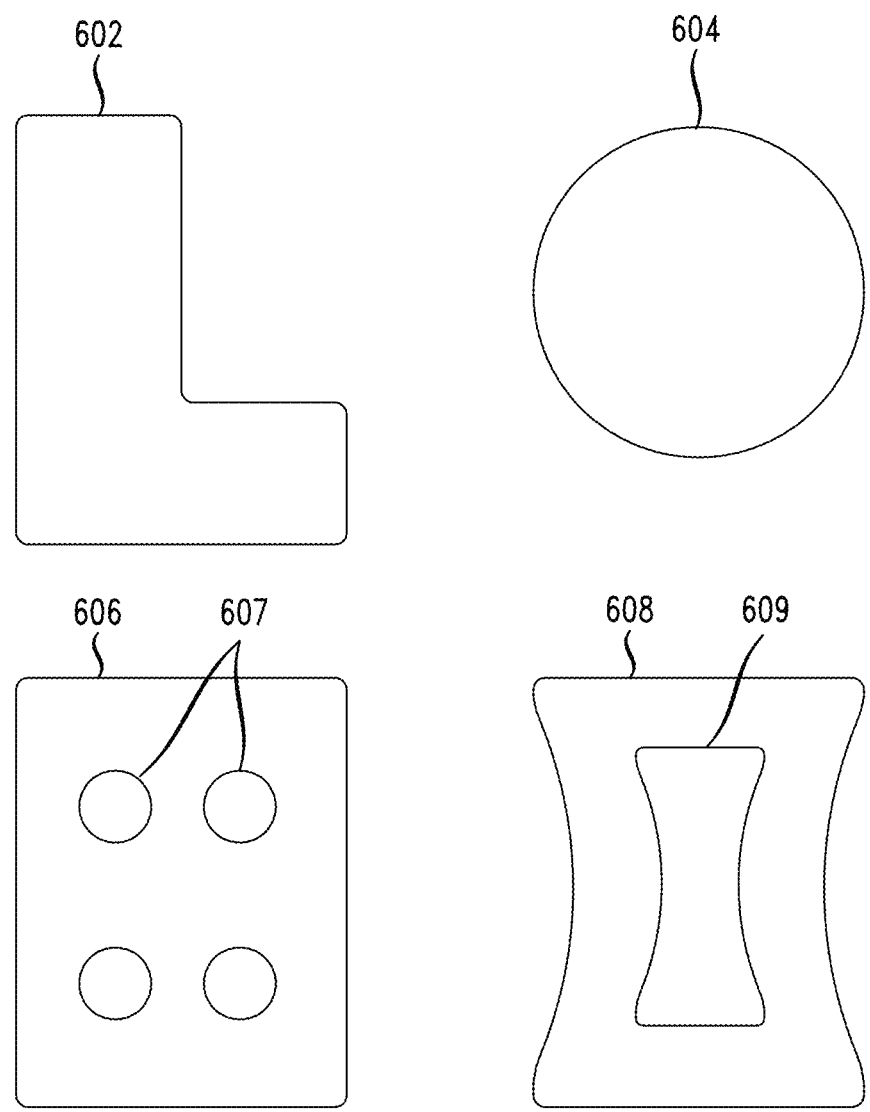
FIG. 6 illustrates example shapes of the inserts for use in a helmet.

FIG. 6 illustrates various shapes of inserts, some with holes and opening in them. Insert 602 is "L" shaped. Insert 604 is round. Insert 606 is rectangular and has optional holes 607 which can provide some flexibility and expansion space when the Bingham Plastic changes phase. Insert 608 is "I" shaped with an optional opening 609 also to allow for expansion. These configurations are provided as examples only. Any shape with or without openings or holes within the shape are contemplated. The openings may be provided as a way to reduce the weight of the insert, as the inserts with Bingham Plastics generally weigh more than the standard foam.

The shape of the inserts or other structures associated with the helmet can be made via patterns such as, for example, patterns of triangles, squares, regular or irregular rectangles, patterns of pentagons and hexagons or other polygons. The structures can also have cutout sections between or internal to shapes.

Figure 7:
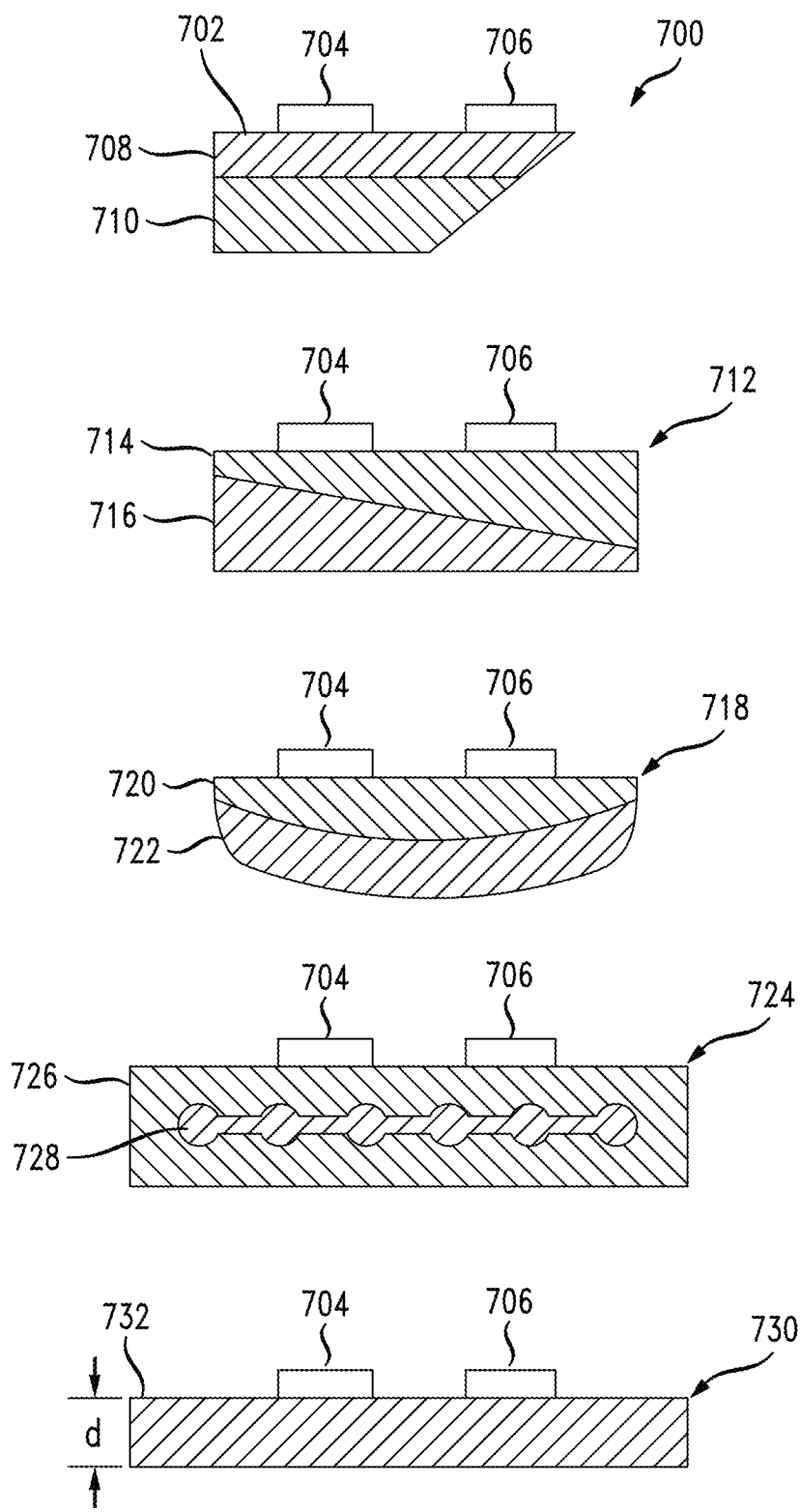
FIG. 7 illustrates various structures that can be used for the inserts.

FIG. 7 illustrates a number of variations on this disclosure with respect to a cross sectional view of an exemplary insert. Insert 700 includes fasteners 704, 706 and a first layer 708 with a second layer 710. A top portion 702 is generally nearest to the inner surface of the outer shell of a helmet. The right side of the layers is angled. This embodiment shows how the shape on one or more vertical surfaces can be angled. Insert 712 shows layer 714 and layer 716 such that the interface between these two layers is angled. Such an approach could be used where a thicker Bingham Plastic layer (for example, layer 716) might be desirable at a particular location within the helmet. In such a case, over the distance of the insert 712, there may be another portion that does not need as much Bingham Plastic in another portion of the insert 712 due to the configuration of the head of the wearer or likelihood of a concussion due to impact at that location.

Insert 718 shows layer 720 and 722 with a curved interface between the layers and layer 722 having a curved lower surface. Insert 724 shows a layer 726 with an internal layer 728. In this case, the Bingham Plastic could be the layer 726 or the layer 728, or they both could have Bingham Plastic but with different characteristics. Layer 728 could be open as well to allow for expansion or flow of liquid in the transition. Layer 726 could be more traditional foam while layer 728 could be the Bingham Plastic. Insert 730 illustrates a height "d" for layer 732 which as noted above can generally represent the height of any insert disclosed herein and is variable. It is noted that any of the configurations disclosed herein can be interchangeable in a part or completely. For example, insert 712 could be combined with 718 such that the lower surface of layer 716 is curved in the same way that the lower surface of layer 722 is curved.

Figure 8:
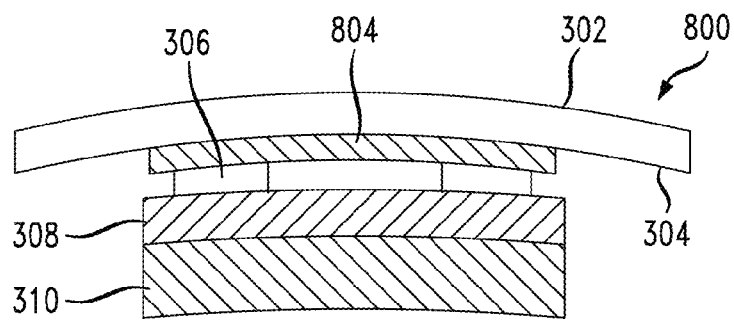
FIG. 8 illustrates another embodiment having a plastic layer between the shell and the fastener for the insert.

FIG. 8 illustrates another embodiment in which layer 804 is shown as another layer between the shell 302 and the fasteners 306. Insert 800 can include layer 802 which could be a Bingham Plastic layer or a layer of foam padding or other type of cushioning material included for comfort.

The above embodiments focus on the use of Bingham Plastics as part of the structure of a removable insert on the inner surface of the helmet. The next aspect of the helmet embodiment is the disclosure of the use of plastisols on the outer or inner surface of the helmet. These two aspects of course can be separate or combined into a single helmet. A brief discussion on the studies performed using various plastisols is presented followed by a description of the helmet having one or more plastisol sections, portions, or layers attached to the outer surface of the helmet.

Discussion of Plastisol Study

Next is discussed the preparation of the helmet prototype disclosed herein with respect to a plastisol layer on the outer surface of a helmet. The process of preparing the prototype helmet using an outer layer of a plastisol is first presented. A plastisol is a suspension of PVC (vinyl chloride) particles in a liquid plasiticizer. When heated to an appropriate degree, the plastic and plasticizer mutually dissolve and a permanently plasticized solid is the result. To create the solid helmet prototype, the existing helmet was stripped of all its hardware; face mask, buttons, etc. Sheets of two different hardness plastisols (Shore Hardness 16—henceforth SH16, and Shore Hardness 90—henceforth SH90) were baked. The instructions on how to bake these and all other plastisols are specified herein. The softer layer, SH16, was adhered to the helmet first. Following this, the harder, SH90, was applied on top of the softer SH16. To apply the softer layer, the sheets were cut into strips approximately three to four inches wide. Each strip was laid on the helmet to mock up the location for it to be applied, then PVC primer and solvent cement were applied to the back of the strip as well as the helmet. Alternatively, a single layer of plastisol could have been applied over the entire helmet using molding techniques.

Figure 9:
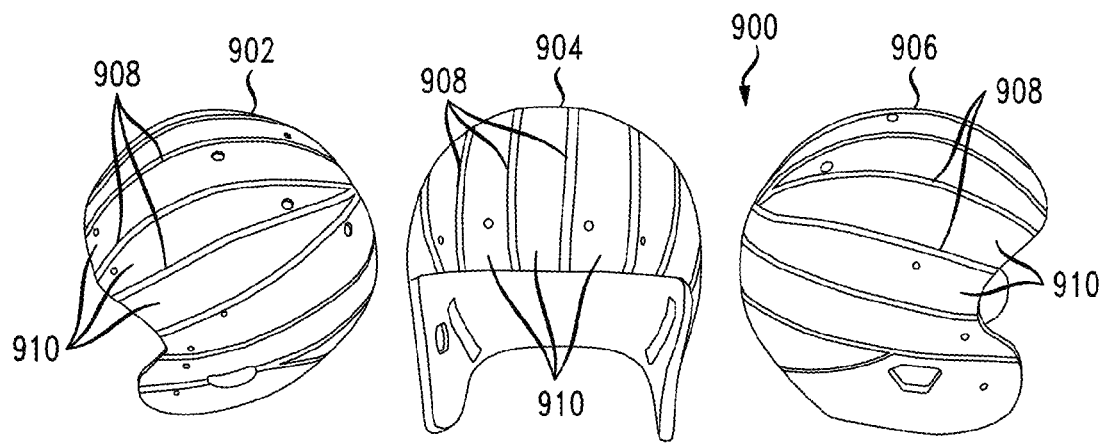
FIG. 9 illustrates a plastic outer surface to the shell of a helmet.

The strip was then held in place while the solvent set, around five minutes. After the solvent was set another strip was placed next to it and trimmed to adjust for the curvature of the helmet and the strip it would touching. The primer and solvent were then applied, as before, also repeating the step of taping the strip in place. This was repeated until the entire exterior of the helmet was covered in the softer SH16 plastisol. Then the SH90 plastisol was adhered on top of this. To apply the black the sheets were cut into strips, again as needed, but of a width of approximately one to one and a half inches. The smaller strips allowed for greater flexibility on the much stiffer material. The same steps for applying the strips were taken, but with a longer time allowed for the solvent to set, approximately ten minutes. Again, this was repeated until the helmet was covered in SH90 plastisol. Cracks between layers were then filled by applying SH90 plastisol in its liquid state to the cracks, a small section at a time to prevent running. The liquid was then cured in place using a heat gun. FIG. 9 illustrates the embodiment. The entire helmet was then sanded and painted. Finally all the hardware was reinstalled. Alternatively, the harder layer could be formed as a single layer using molding techniques and could be adhered directly to the softer layer while in a liquid state.

Figure 10:
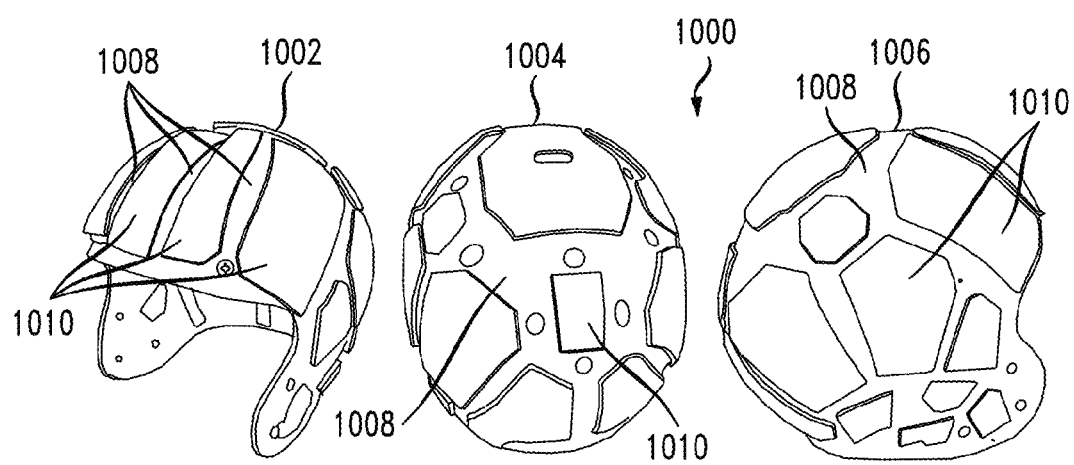
FIG. 10 illustrates an alternate approach to the plastic outer surface of the shell of the helmet.

A segmented helmet prototype began the same way that the solid helmet did, by removing all the standard hardware from the helmet. Five sheets of layered Shore Hardness 4 (SH4), and Shore Hardness 16 (SH16) plastisols were baked. The SH4 was baked first and then the SH16 baked on top of it. The layered sheets were then cut into shapes from a predetermined pattern. The pattern has two of every part simply mirrored from each other, except the middle three patches. Alternatively there can be non-symmetric patterns. FIG. 10 illustrates the different parts on the outer surface of the helmet. Each patch was then glued in place using super glue, and then the patches were held in place to allow the glue to set. Alternatively, the patches could be formed directly onto the helmet using molding techniques. The final step was to refit all the standard hardware and internal pads to the helmet. Similar techniques can be used to adhere the plastisol layer to the inner surface of the helmet.

The method used to develop the plastisol embodiment is described next. The plastisols used were described by their Shore Hardness values. The different plastisols used were pigmented for simple distinction: No. 4 (yellow), No. 16 (blue), No. 33 (red), No. 65 (green), and No. 97 (black). Of course any pigmentation choice will do. An oven was used to bake the samples. The plastisols were baked at a temperature of 350 F in a baking pan. The oven is level to avoid uneven thickness with the baked sheets. 100 ml gives 1 mm thickness when using a 6×9 steel pan. A thin sheet of 1 mm of No. 4 plastisol (100 ml volume) (yellow), was baked in the oven for 8 minutes at 350 F.

After 8 minutes, the pan was placed on a level surface and allowed to set for 5 to 10 minutes. (Note: the yellow plastisol was still fluid when taken out of the oven. If not placed on a level surface, uneven thickness resulted in the sheet).

The time required for making the sheet is dependent on the volume used. The use of ratio and proportions can be used to determine how much time it should be baked. For the No. 16 plastisol (blue), for a sample of 1 mm thickness, the baking time was 6 minutes at 350 F. Samples were removed from the oven and let cool for 5 minutes. The No. 16 plastisol sets in the oven. However, it is advisable to place all samples on a level surface. For a 2 mm thickness, the baking time was 9 minutes with cooling for about 5 minutes. As the thickness of samples increases, the baking time is increased by 3 minutes.

For the 1 mm thick, No. 33 plastisol (red), the bake time at 350 F was 10 minutes and was allowed to set on a level surface for 5-10 Minutes. The ratio and proportion can be used to determine the how much time is needed to bake thicker sheets of No. 33 plastisol.

For the 1 mm thick No. 65 plastisol (green), the bake time at 350 F was 8 minutes. No. 65 sets in the oven, however, the sheets were placed on a flat surface to cool. Ratio and proportion can be used for thicker sheets of No. 65 plastisol.

For the 1 mm thick No. 90 plastisol (black) sample, baking took place at 350 F for 10 minutes. This plastisol also sets in the oven. The ratio and proportion can be used to determine the how much time is needed to bake thicker sheets of No. 90 plastisol.

A layer of a given material is baked according to the above procedures. Before letting the layer completely cool, but after ensuring the plastisol was no longer liquid (in the case of No. 4), the next layer of material was poured on top of the existing layer to yield a multi-layer plastisol. The multi-layer plastisol was then replaced in the oven for the time and temperature indicated for the given material. This process was repeated if necessary for multiple layer systems.

In an open mold it was important, but not necessary, to maintain a level pan to keep uniform thickness. In a closed mold configuration such as would be employed in a production environment, this would not be as important. There are other rubber materials that can be used besides plastisol, including styrene-butatdiene-styrene and styrene-isobutylene-styrene, and urethanes.

Plastisols with "Shore A" hardness values of 4, 16, 33, 65, and 97 were studied. Shore A hardness refers to a material's resistance to indentation. The "A" scale is for softer plastics. Samples were produced using these materials in single, 3, and 5 layer configurations. Additional samples were produced in 2 layer and "feathered" configurations. Shear testing, compression testing and impact testing using the various configurations of plastisols were performed. Impact testing on a helmet having at least one plastisol layer on its outside surface was performed by releasing a 5.5 kg sphere with approximately 100 Joules of potential energy towards a strike plate holding the sample under investigation. The potential energy of the strike plate after impact was measured and the difference between the two was a measure of the absorbed energy by the material receiving the strike. The test was performed initially with an approximately 3 kg strike plate and then again with an 8 kg strike plate.

The impactor, a shot put suspended by cable, was released from a fixed point to impact the strike plate at its lowest point. The strike plate then moves away in the direction of strike and the movement of the plate was recorded using video. The video was analyzed frame by frame to determine the highest point of motion of the strike plate and the initial kinetic energy as well as the final potential energy was calculated.

Three replications were performed for each impact condition, both for light and heavy strike plates. The light strike plate had a mass of 3.1 kg and the heavy strike plate had a mass of 8.3 kg. Of interest is the energy absorbed by the target. The absorbed energy was calculated by comparing the energy transferred to the target without any plastisols on it to the energy transferred when the plastisols are in place. The difference between the two represents the absorption of energy from the plastisols.

Different configurations of plastisols were considered for evaluation. In a baseline set, samples made of a single layer of each hardness of plastisol were produced. Data was gathered to determine the effect of hardness for single and double layer samples on the absorbed energy of the target. A 100 Joule pendulum impact was tested. Two frames were used—a light 3.1 kg frame and a heavy 8.3 kg frame. Double layer samples had a thin (1 mm) layer of SH97 plastisol on the strike surface and a thicker layer of software material on the obverse side. For a small Shore A hardness, with the light weight target, the soft material (SH4) absorbs the most energy, but then there is vanishing effect. When the heavy target was used, there was virtually no effect of the material when in a single layer. From a dynamics perspective, the heavier target resulted in less energy absorption because the increased mass means that the potential energy associated with deforming the target can be transferred back into kinetic energy. The double layer material, having a rigid surface that meets the impactor, shows more energy absorbing properties when struck.

The mechanism of energy absorption is primarily plastic deformation of the material. The material goes through dramatic plastic deformation as a result of impact. The 4 hardness material had complete rupture and delamination from the hard strike surface. The 16 hardness material shows yielding failure and partial delamination from the hard strike surface.

The same data was calculated in terms of the additional energy absorbed by the material—taking the energy absorbed divided by the energy transferred to the strike plate when no material was present. 3 and 5 layers configurations were also tested.

A second test configuration was also studied. The configuration was changed to an oblique impact, where the strike plate was rotated 60° off vertical to allow a shearing type of oblique blow. The position of the strike plate before and after impact under this oblique impact configuration (at maximum displacement) were determined and the method of analyzing the energy absorbed by impact proceeded as before. The purpose of this test is to evaluate glancing impact on the material. Glancing impacts have a tangential displacement component which can apply enhanced shearing energy. The energy transferred through a glancing blow is a combination of factors, including the compressive stiffness of the material and the shear stiffness.

Different material configurations were tested as before and the results are presented here. Only the heavy frame was used for this testing. For single layer materials, the energy absorbed during impact follows a complex path, with a surprising high value for the SH97 material. It is possible that the SH97 material provides a slippery surface for the impact to slide off instead of transferring energy to the target. The three layer materials subject to oblique impact showed behavior that is exactly opposite of what was expected. The absorbed energy increased with core material hardness, instead of decreasing. The five layer systems were relatively insensitive to the softness of the second and fourth layers.

Low energy impact was studied as well. The study discussed above used 100 Joules as the impact energy. An additional round of testing was performed using 33 Joules as the impact energy. The value of 100 Joules represents the upper level of impact from the literature. 33 Joules is estimated to be a more common level of impact. Depending on size of the area it is spread over, up to 75 Joules can potentially be a deadly impact. Tests were performed in the vertical, compression impact configuration to evaluate the behavior of the materials under lower energy of impact.

The study included charting the absorbed energy from 33 Joule impact on single layer and 97/x configurations (where a thin, 1 mm, layer of 97 is applied to the strike surface). There is an additional sample, labeled "Feathered" and marked as a diamond, where the material was made as SH97/65/33/16/4 to gently transition from the SH97 value to a value of 4. In the data, the feathered sample absorbed between 1.3 and 3 J of energy. The data was indicated as a Shore A hardness value of 38 for the feathered sample—an average of the hardness of the feathered layers.

All of the various 3 and 5 layer combinations were also tested at 33 Joules impact. The highest impact absorption in the study was the feathered sample which absorbed between 23 and 30 percent of the potential energy transferred. There appeared to be a strong trend at 33 Joules impact—particularly the softest materials dominate the energy absorption. Even layered systems tend to fall on the trend of the behavior of the softest layer of the system. The 5 layers samples all absorbed about the same percentage at about 15% no matter what the level of the Shore A Hardness level. The 1 layer sample absorbed more energy at the software Share A Hardness values below 30.

Helmets with a Plastisol Outer Layer

In another embodiment, protection on the exterior of the helmet was applied using plastisols prepared as described above. Plastisol materials were applied to the exterior of a helmet to demonstrate the potential for shear absorbing performance. Weight is a significant concern in this situation, so a thin (3 mm) system or layer was applied to the exterior consisting of a layer of SH33 at the outer surface of the helmet and a layer of SH97 at the exterior. It was determined that it was not necessary to have a SH97 layer at the interior as the helmet itself provides the stiffness.

Flat sheets of material were made and then transferred to the exterior surface of the helmet as shown in FIG. 9. The curvature of the helmet introduced difficulties due to the differential strain from interior to exterior. Because the exterior (in tension) is the hardest material, curving the pieces resulted in primarily compression of the softer interior material, which leads to internal normal strains and inter laminar shear trying to separate the layers. The helmet formed with 33/97 Hardness is illustrated in FIG. 9 after the hardening. The pin striping 908 was added to disguise the seams that formed between strips of materials.

FIG. 9 illustrates three helmets 900 with a thin layer of plastisol attached to the outer surface of the shell. Helmet 902 shows layers 910 which represent a thin layer of plastisol attached to the outer surface. The layer can be between 0.5 mm and 5 cm in thickness and attached by any known adhesive to the shell. Feature 908 represents spaces, strips or gaps of space in which there is no layer. The gaps 908 provide some expansion space for the plastisol 910 layers in case of impact. Helmet 904 shows a frontal view of the layers 910 and the gaps 908. Helmet 906 shows another side view.

FIG. 10 illustrates another set of helmets 1000 in which helmet 1002 has spaces 1008 and plastisol layers 1010. As is shown in helmets 1002, 1004 and 1006, the plastisol layers 1010 can have different shapes and sizes. These layers can be of varying thicknesses, sizes and shapes depending on the location on the helmet and need for protection at a particular location. Gaps 1008 are also shown in between the plastisol portions 1002, 1004, 1006.

The strips of plastisol were adhered to the helmet using PVA adhesive (typically used for joining PVA plumbing). The material was spray painted afterwards to smooth out the appearance because of the strip formation method. The helmet with the exterior layers was heavier than the original due to the high density of solids in the plastisols and the applied paint.

An additional prototype exterior helmet was made to demonstrate the concept more fully. Although the material choice (4/16) is not an optimal choice for true impact performance, 4/16 is a good choice to demonstrate the concept. The 4/16 material easily shears under hand pressure so can be used to explain the process. The material was applied to the exterior of the helmet with gaps 908/1008 between the pads to further demonstrate the shearing capability and to reduce the total amount of increased weight in the helmet. Having free edges allows for more motion. The plastisols were cut into shapes and adhered to the helmet using glue or superglue (cyanoacrylate).

In production, mixing of plastisols or other rubbery elastic plastics would be achieved in an extruder or other industrial blending equipment. The helmet coating will be produced with closed molds or using spin or rotational molds. Full scale production equipment is used to generate the helmet plastisol coatings.

Cartridge Embodiment

Figure 11:
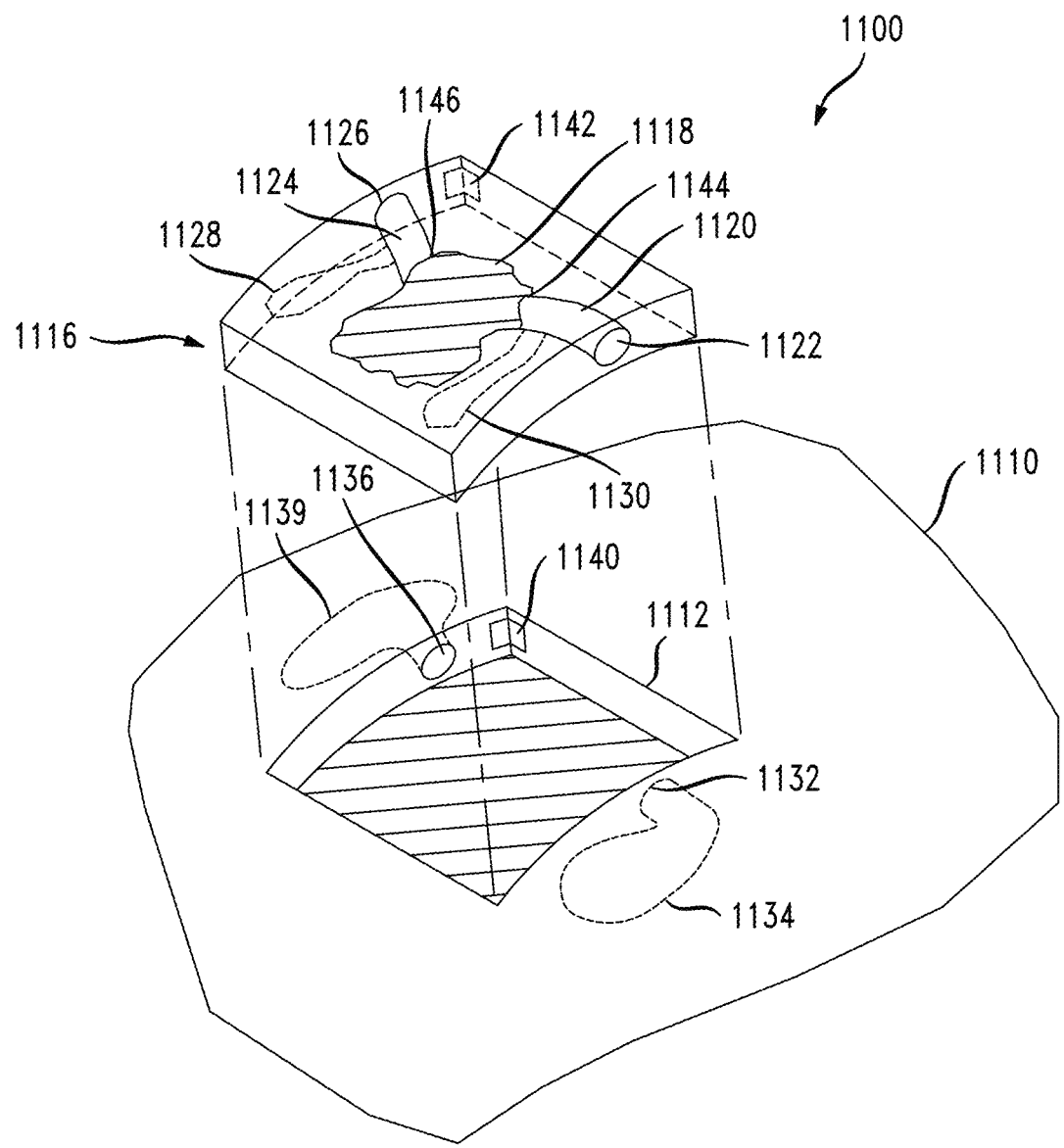
FIG. 11 illustrates a cartridge embodiment.

Next, this disclosure continues with FIG. 11 and another embodiment of the insert or cartridge which is replaceable. FIG. 11 illustrates an example embodiment of the present disclosure. A cartridge or insert 1116 is shown as insertable into a helmet 1110. It is noted that the helmet 1110 could also represent any surface or any protective layer such as a shield, body armor, wall or any other protective layer in which a cartridge 1116 as is disclosed herein could be inserted. Cartridge 1116 is a replaceable insert or cartridge that can be part of the outer shell 1110 of the helmet. In general, it is noted that the concept covered in the present disclosure is a removable cartridge which can be positioned within the helmet 1110 at a high impact location. In this case, a highly effective energy dissipation structure can be employed within the cartridge 1116 which, may be irreversible. For example, if the use of Bingham plastic as applied to the cartridge 116, then upon a sufficiently high impact, the energy is dissipated by the conversion of the Bingham plastic from a rigid body to a viscous or Newtonian fluid. The displacement occurring when the fluid flows may be inconvenient to reform, that is irreversible. Therefore, the present disclosure provides for replacing the cartridge in the helmet with a new cartridge with Bingham plastic which is in the appropriate place in the cartridge and is a solid.

As is shown in FIG. 11, the example structure includes the cartridge 1116 with various features. The Bingham plastic 1118 is represented as being within the cartridge. The positioning is merely exemplary as the Bingham plastic will be positioned throughout the cartridge in such a way as to be able to absorb the energy of an impact on the cartridge 1116.

When an impact causes the Bingham plastic 1108 to convert to a liquid, the liquid will likely flow into one of several reservoirs. For example, an opening 1114 is shown at an edge of the Bingham plastic 1108 which leads to a channel 120 having an opening 1122. This opening 1122, when the cartridge 1118 is positioned in a receiving parameter 112 to coincide with an opening 1132 which connects to a reservoir 1134. In this example, the reservoir is found within the helmet 110. In this case, this allows the Bingham plastic in its fluid state to flow away from the cartridge 1116 and into a separate reservoir. Similarly, a second opening 1146 is shown in the cartridge 1116 which includes a channel 1124 which leads to an opening 1126. This opening corresponds to opening 1136 in the helmet 1110 which leads to a second reservoir 1138. It is contemplated that these reservoirs may be interchangeable within the helmet. In other words, if an impact is received on the cartridge 1116 and the Bingham plastic 1118 converts from a solid to a liquid and the first reservoir 1134 and the second reservoir 1138 (or simply one of the reservoirs) is filled with fluid from the Bingham plastic, then while the cartridge 1116 may be removable and replaced, the reservoirs 1134 and/or 1138 may also be removed and replaced with an empty reservoir.

In another aspect, the channel 1120 could lead to a reservoir 1130 within the cartridge 1116. A second reservoir 1128 is also shown as being connected to the reservoir 1124. Thus, in an ultimate embodiment, the reservoir which receives the viscous or Newtonian fluid can be positioned within the cartridge 1116 such that the cartridge is completely integrated. Feature 1142 of cartridge 1116 generally represents a fastening mechanism which corresponds to feature 1140 within the helmet. There may be a number of different structures which can be used to replaceably secure the cartridge 1116 within the helmet and any and all such techniques and structures are contemplated as within the system 1100 disclosed in FIG. 11.

The helmet can include a helmet structure having an opening with a perimeter. The perimeter defines the opening which will receive the cartridge. The cartridge includes a complimentary structure to the opening and includes a structure which, when absorbing energy from an impact upon the cartridge, converts the structure in form to absorb the energy in an irreversible manner such as by converting from a solid to a liquid. A fastening mechanism removeably fastens the cartridge in the opening of the helmet. The cartridge includes a top layer positioned to receive an impact and an absorbing layer which includes a material which absorbs energy from an impact in an irreversible manner such as by converting from a solid to a liquid. The fastener removeably fastens the cartridge into an opening in a larger structure.

Figure 12:
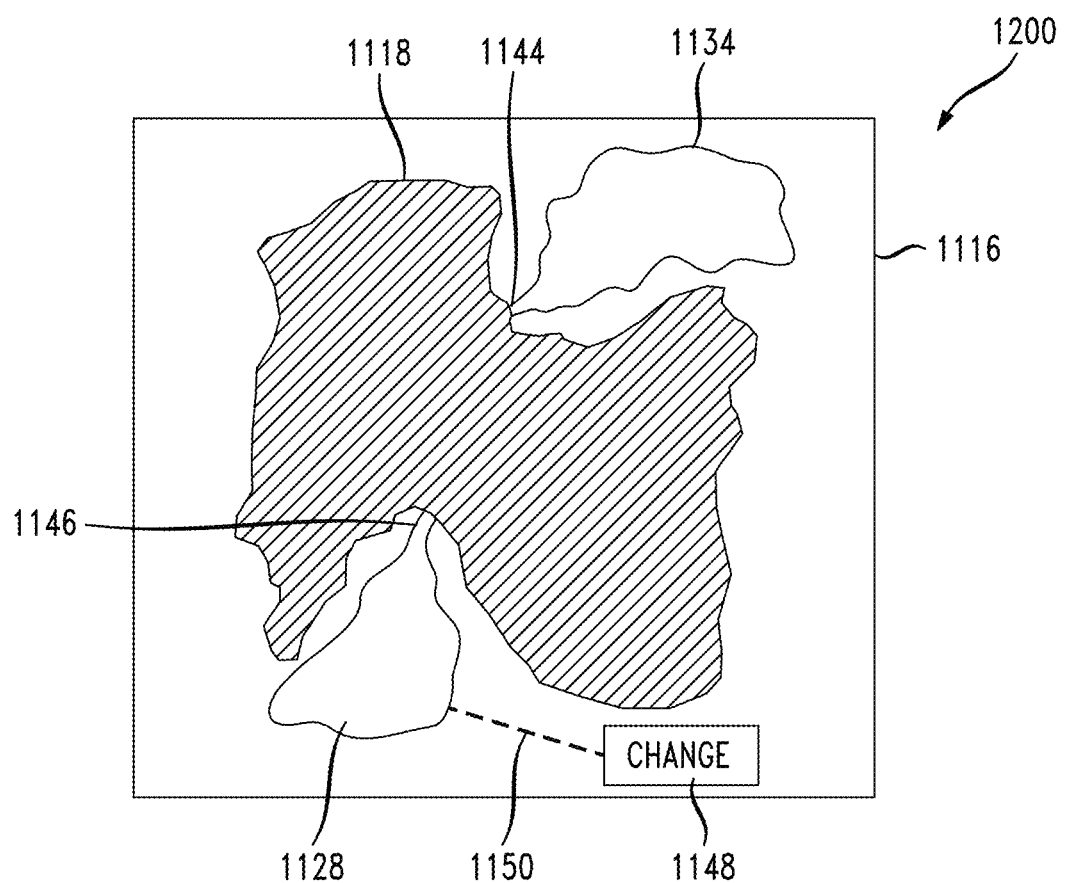
FIG. 12 illustrates an alternate approach to the cartridge embodiment.

FIG. 12 illustrates another example embodiment 1200 of the cartridge 1116 in which one or more reservoirs are positioned within the cartridge. The Bingham plastic 1118 is shown with a particular structure within the cartridge 1116. An opening 1144 leads to a first reservoir 1134 and an opening 1146 leads to a second reservoir 1138. These can represent one or more reservoirs into which the Bingham plastic would flow upon a hit of sufficient impact. The hit on a helmet and thus the hit on the area of on a cartridge 1146 can occur in several locations and the positioning of the Bingham plastic 1118 throughout this area as well as the positioning of reservoirs 1128 and 1134 can be made based on a statistical probability of a position of hits within the area of the cartridge 1116. Therefore, the particular locations within the cartridge 1116 in FIG. 12 are merely illustrated.

In some cases, the cartridge may receive impacts and cushion those impacts but the force may not be sufficient to cause the Bingham plastic to convert from a solid to a liquid. Therefore, a football player may not recognize when the cartridge needs to be replaced or not. In one aspect, a notification symbol 1148 can be in communication 1150 mechanically or electrically with a reservoir 1128 and/or the reservoir 1134. There may be several different mechanisms which either can illustrate via a display or a color representation on the helmet that the Bingham plastic has sufficiently converted from solid to liquid so as to reduce its effectiveness. For example, the Bingham Plastics may include two different layers in which each layer has a different color. When an impact occurs that causes the solid to change to a liquid, the two layers may mix revealing a color that indicates to a user that the cartridge needs to be replaced. The concept of having different colored layers is discussed more fully below with respect to FIG. 13. Electrical signals which can be visual or an audible signal such as a chirping can be employed to notify the user of the need of replacement.

In one example, the feature 1148 can represent an electronic communication 1150 with the reservoir wherein a sensor indicates that the reservoir has filled with the viscous fluid of the Bingham plastic and a signal can be sent wirelessly and electronically to a receiver which would then provide notification to a person such as a coach or a trainer that a particular players cartridge has been triggered and thus there is a need for a replacement cartridge to be placed within the helmet. Other sensors and notification systems can be provided such as a sound or an impulse or a light and so forth. Sensors could be provided in one or more channels 1120, 1124 or any place along the path that the viscous fluid would flow in order to provide the appropriate notification that the helmet is no longer safe but has absorbed an impact and has successfully prevented potentially a concussion.

A benefit of the present approach is that rather than having entirely replaceable helmets, the system could provide the optimal amount of protection at a particular high impact location upon a helmet. Thus, the present approach would not require the entire replacement of helmets but only the replacement of a portion of the helmet which can utilize a feature such as a Bingham plastic or any of the other features disclosed in the priority applications.

In other words, another embodiment could be utilizing a foam structure with a varied density and having a particular shape. In one aspect, when a hit occurs at a particular level of force, the foam structure may collapse or may absorb the energy of the impact in such a way as to be nonreversible. Accordingly, the concept of a replaceable cartridge expands beyond the use of Bingham Plastics but involves any application of an absorbing structure within the cartridge that absorbs the energy in an irreversible way.

Figure 13:
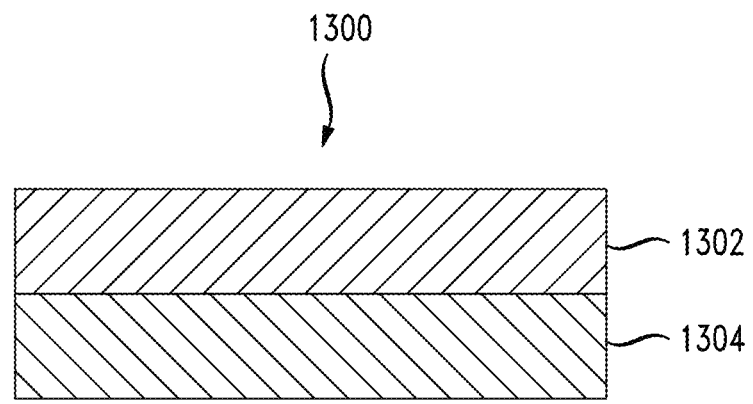
FIG. 13 illustrates the layering approach to an embodiment.

FIG. 13 illustrates another embodiment that relates to how to provide notification of when a Bingham Plastic has changed phase due to an impact to the insert and thus the insert needs to be replaced. This concept was introduced briefly above. The insert 1300 in FIG. 13 includes two layers 1302 and 1304. These two layers can both be made from the same or different types of Bingham Plastic. However, the difference in FIG. 13 is that there is a certain color scheme to each layer such that when an impact occurs, and the solid turns to a liquid, it causes the layers to blend physical which can reveal a color to the user.

For example, layer 1302 could be made of a red Bingham Plastic and layer 1304 could be white. If the inset 1300 is placed in a helmet, then the user would see the layer 1304 white layer. However, if an impact caused the insert 1300 to absorb the energy to the level where the plastics changed phase, then the red in layer 1302 would blend with or bleed into the layer 1304. The user could check the color and see that the layer 1304 was no longer white but had some red showing. This would indicate that the insert needed to be replaced. It is noted too that while the height of layer 1302 and 1304 appears to be equal in FIG. 13, that this is only an example figure. The two layers may be of a different height. For example, layer 1302 may be much thicker than layer 1304 so as to more easily show when the plastics have turned to liquid. The relative thickness or shear thresholds of each layer can be tailored to the level of impact which will indicate a change need to be made in the insert.

Figure 14A:
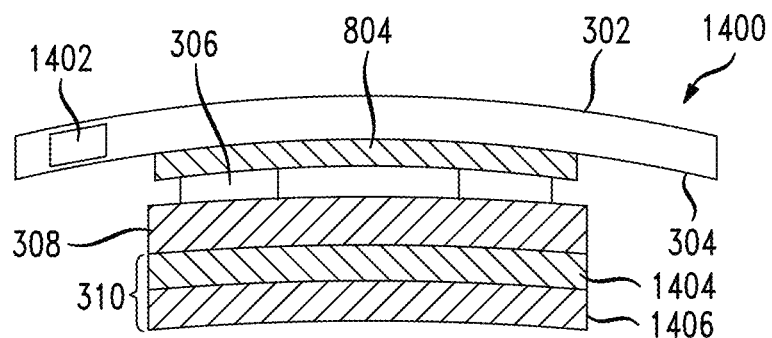
FIG. 14A illustrates an embodiment wherein the plastic layer has multiple layers which mix upon the threshold shear impact being experienced to change a color of the insert and provide notice of the impact.

FIG. 14A illustrates the insert in more detail in a helmet 1400. The outer shell 302 is attached to the insert via a fastener 306. Optional layers 804 and 308 can be constructed either of a foam structure, a Bingham Plastic structure or some other structure. The Bingham Plastic layer 310 can include a first layer 1404 of one color, such as red, and another layer 1406 of another color, such as white. As noted above, when an impact occurs, the color in 1404 will bleed into or blend with the color in layer 1406 such that it provide "notice" to the user that the insert should be replaced. There also could be an electronic notice provided in which a signal is sent to a module or device 1402 in the helmet 1400 that turns a light on or provides some other indicator that can be seen from the outside of the helmet.

Figure 14B:
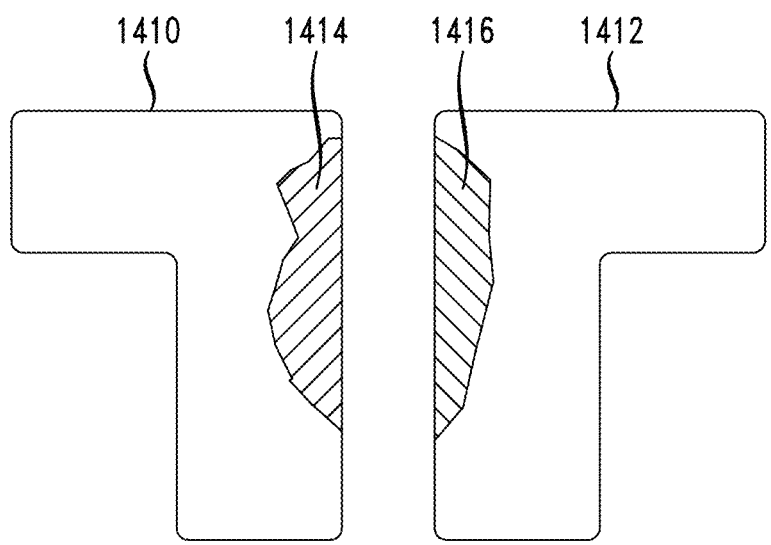
FIG. 14B illustrates the change in color of one or more inserts.

FIG. 14B illustrates a first insert 1410 and a second insert 1412 and demonstrates what the "notice" could look like. Here, the impact area was between insert 1410 and 1412. While most of the viewed surface area of these two inserts is white, there is a portion that has coloration in portions 1414, 1416. If the user had an excessive impact in a game or in an event like a bike accident, they could take their helmet off and look at the inserts. If the inserts show what is illustrated in FIG. 14B, then the inserts would be replaced.

While two layers are shown, it is contemplated that the insert could have more than two layers of different colored Bingham Plastics in the insert. For example, the insert could have 3, 4, 5, 6 or 7 or more layers.

Figure 15:
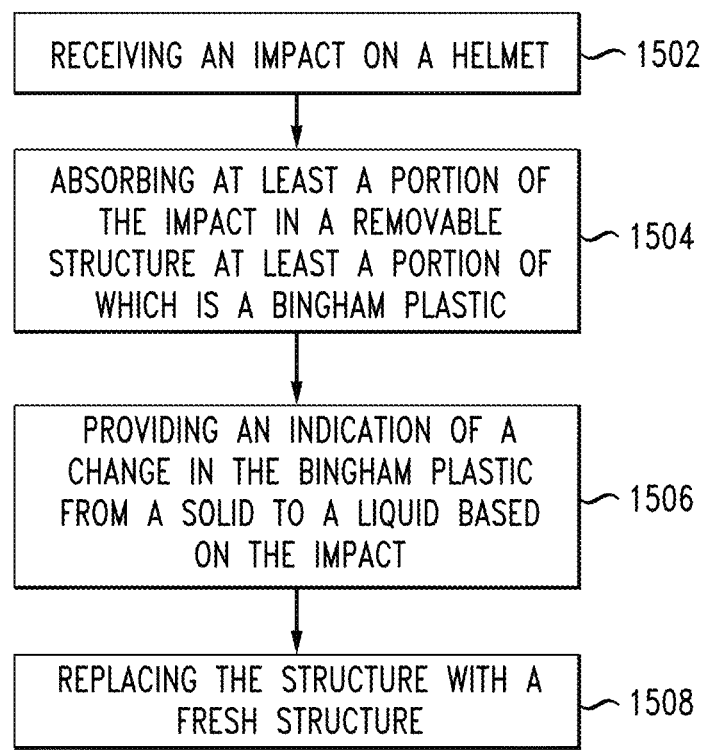
FIG. 15 illustrates a method embodiment.

A method embodiment is shown in FIG. 15 and illustrates a process associated with the use of the inserts. An exemplary method includes receiving an impact on a helmet (1502), absorbing at least a portion of the impact in a nonreversible (or reversible) structure (i.e., the insert) (1504). The impact is absorbed at least in part by the Bingham Plastic in the insert of the helmet converting from a solid to a liquid. The method further includes providing an indication of the change from a slide to a liquid based on the impact (1506). The indication could be a change in color, a change indicated by electronic mechanisms, a change in shape or texture of the insert, or in any other fashion. Finally, the method includes replacing the structure with a fresh structure (1508). The insert structure could also be reversible in some manner. Not each step above is necessary to practice the method as any one or more steps could be excluded.

This method covers the basic aspect of use of the cartridge disclosed herein. It includes the concept of the cartridge within a structure 310 absorbing an impact to such a degree that the structure within the cartridge changes its form in an irreversible way. In this case, the cartridge is no longer useable to absorb impacts and it needs to be exchanged. Therefore, the method includes the feature of exchanging the energy absorbing structure that has changed its form in an irreversible way with a new cartridge which has its structure intact inasmuch as it has not yet been changed via the absorption of the energy of an impact on the cartridge.

Figure 16:
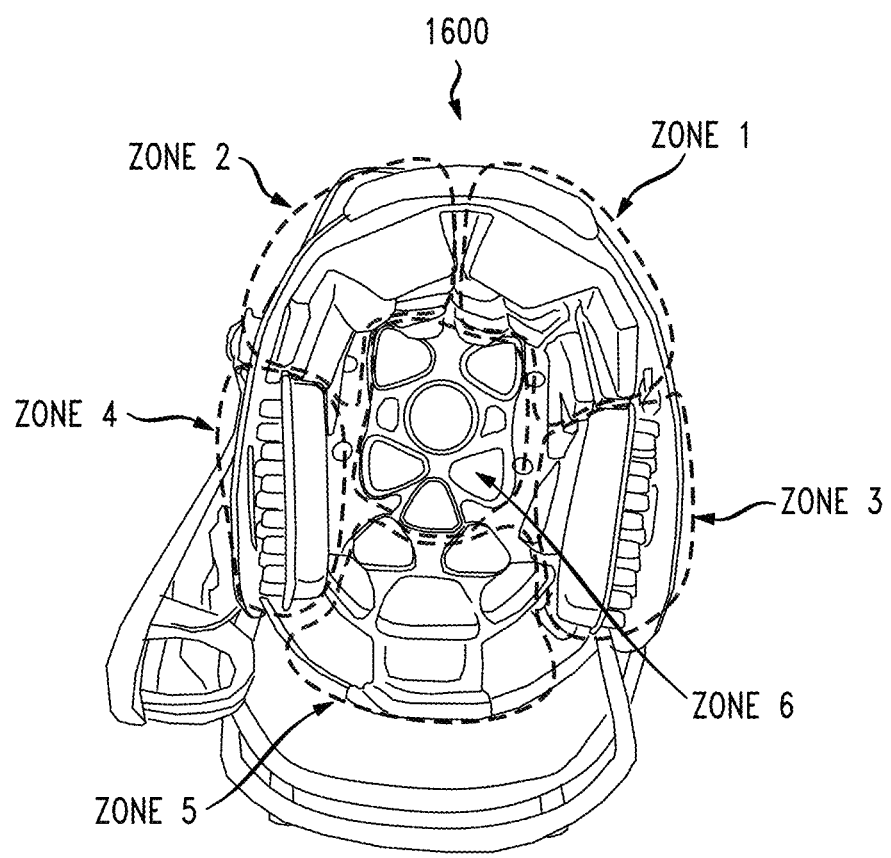
FIG. 16 illustrates zones within the helmet.

FIG. 16 illustrates different zones 1600 within a helmet. Zones 1 and 2 are at the rear portion of the helmet; zones 3 and 4 cover the sides of the head and ears; zone 5 is in the front of the head or the forehead and zone 6 covers the top of the head. These different zones are presented to show that different structures having Bingham Plastics could be used for different zones. The use of the Bingham Plastics can provide a heightened protection; the most strategic zones may have inserts with additional Bingham Plastic by way of a thicker layer of the plastic. For example, the inserts in zone 5 might have ⅔ of the thickness be a Bingham Plastic layer while the remainder is standard foam. The inserts in zones 1 and 2 may have a layer of Bingham Plastic that is ¼ of the entire thickness of the insert or have no Bingham plastic at all. Other zones may have lighter inserts as well to balance out the overall weight or responses to different types or levels of anticipated impact.

Figure 17:
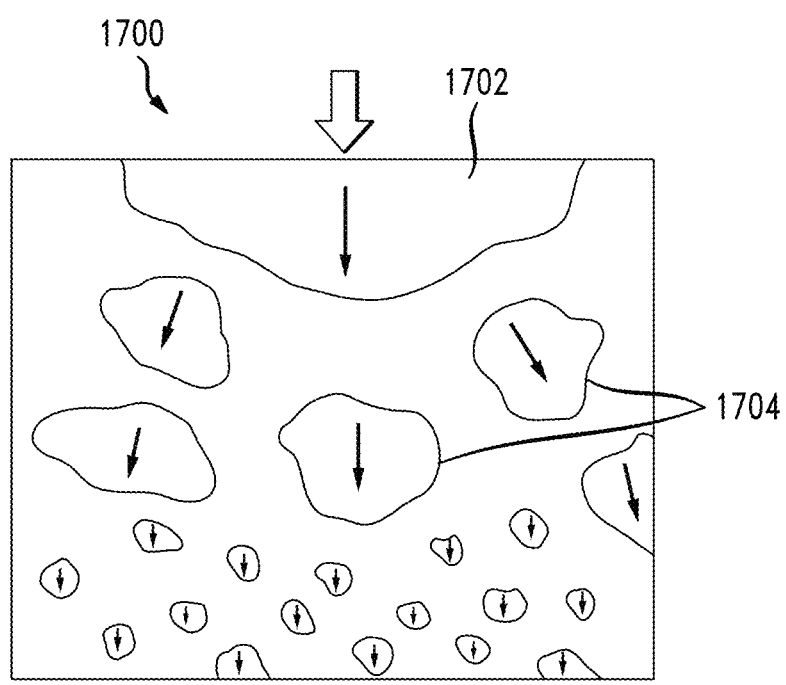
FIG. 17 illustrates transmission of load upon contact.

FIG. 17 illustrates the transmission of load 1700 in compression or impact. The material shown can be, for example, a Bingham Plastic, plastisol or other material. There are multiple scales of reinforcement 1702, 1704 that mediate load transfer between the reinforcement particles. The load of impact is more efficiently transferred from the polymeric matrix, e.g. the Bingham plastics, to the smaller particles. These particles transfer load to the larger reinforcements. These reinforcements may be particles, fibers or flakes of various compositions.

Figure 18:
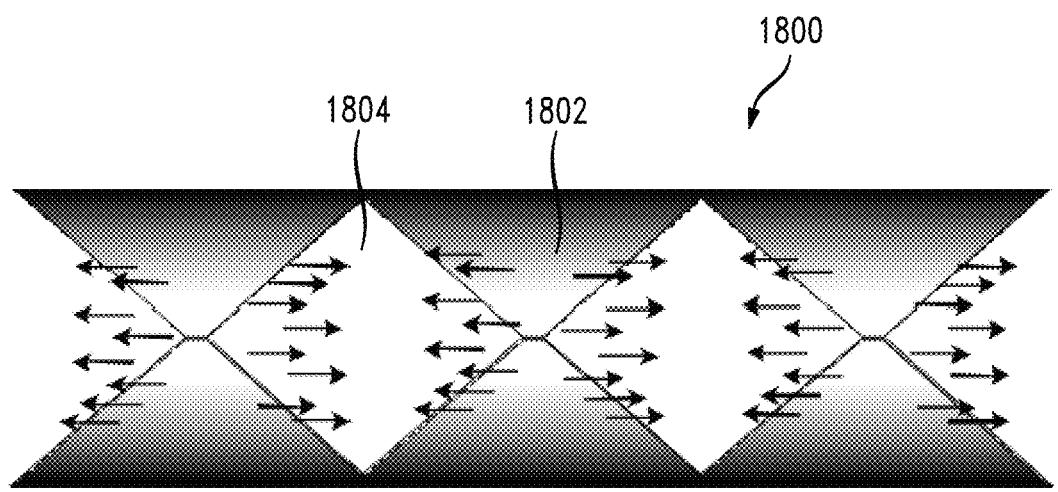
FIG. 18 illustrates a graded foam structure or layer.

FIG. 18 illustrates an example graded foam structure 1800 that can be utilized in any layer of a helmet overall or in any layer of an insert as disclosed herein. As the foam cones 1802 throughout the active dissipation layer take up load, they absorb impact by expanding into the integrated expansion zones 1804. The graded foam structure layer can be, for example, layer 308 in FIG. 14A. As can be seen as well, the density and structure of the foam is graded from a top portion or a base portion (the widest part of the pyramid structure) to the pointed end of the pyramid structure. It is noted that the foam structure disclosed in FIG. 18, as well as any other structure incorporated herein by reference above, can be applied as a layer in the insert or cartridge disclosed herein. Different types of structures disclosed or incorporated herein can also be mixed or blended to create a layer as well. For example, a top portion of a graded foam layer can be triangular and a bottom portion can be of a different shape, such as semi-spherical or rectangular.

In this embodiment, the graded foam structure expands laterally rather than compressing under applied load. Upon the force being applied, the foam displaces laterally to absorb energy without displacement of the inner surface of the insert relative to the surface of the head as significantly or at all. This reduces the amount of energy transferred to the head of the individual, thus reducing the probability of injury. The structure of the graded foam can be triangular, circular, rectangular, or any other structure. The graded foam can be positioned on two structures in a mirrored relationship or two structures with a different shape. The important feature of the structure is that there be space into which the foam can displace laterally to absorb the energy.

The graded foam can be a graded combination of polyurethane foams with different mechanical modulus to provide a target range of deformation threshold energies. In other embodiments, the target range can be achieved using polyurethanes of different chemical or physical densities. The target range can be achieved using polyurethanes with different physical or chemical densities or modulus combined with nanoparticulates and/or microparticulates of silica. For example, the particulates can be other ceramic, metal or plastics. In other embodiments, the plastic can be other flexible foam material, e.g. foamed styrene butadiene rubbers, styrene-butadiene-styrene rubber, or co-polyesters, co-polyamides, or co-polyacrylates.

In another embodiment, the material can be a plastic or a rubber with a low modulus that displaces laterally at a shear threshold. Upon the force being applied, the material displaces laterally, which will slow the transfer of shear energy rather than allowing shearing energy to be transferred rapidly to the surface below. Such a structure reduces the peak energy transferred to the head of the individual, thus reducing the probability of injury.

Additional Impact Structures

Figure 19:
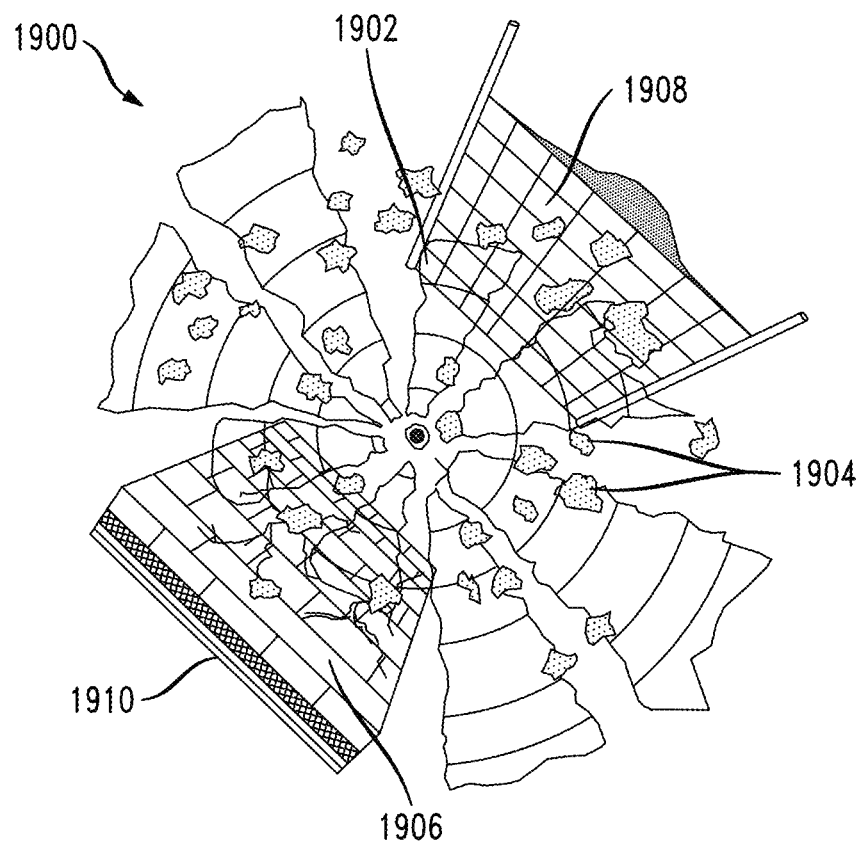
FIG. 19 illustrates several features of this disclosure with respect a blast shock wave and protecting buildings.

Another embodiment of this disclosure relates to other impact handling structures beyond helmets. FIG. 19 illustrates a blast and several walls with structures to handle the blast 1900. A blast usually has two components: a rapidly expanding pressure 1902, or shock, wave that knocks over barriers and objects, and projectiles with sharp, jagged edges 1904 that impact with often devastating effect. This embodiment covers a proposed fabric can be rapidly deployed: against the back face 1910 of an existing wall 1906, in which case the wall may be damaged during the blast but is reinforced to withstand the blast for later repair and mitigate secondary damage to objects or persons outside the building; or free mounted to existing or temporary poles 1908, in which case the impact surface allows the pressure front to pass through without impediment but stops projectile debris, while the back surface expands while dissipating the energy of the compression front. The fabric may not provide full protection against multiple blasts. It is anticipated that these fabrics can be reinforced with various configurations of the components previously explicated. For example, plates covered with Bingham Plastics or multiple rubber layers such as plastisols, can be used to provide surfaces within the fabrics to absorb and dissipate impacts from large shrapnel components. Such materials could also be employed in other protective ways such as on panels attached to vehicles or inside doors or vehicle surfaces and even windows.

Figure 20:
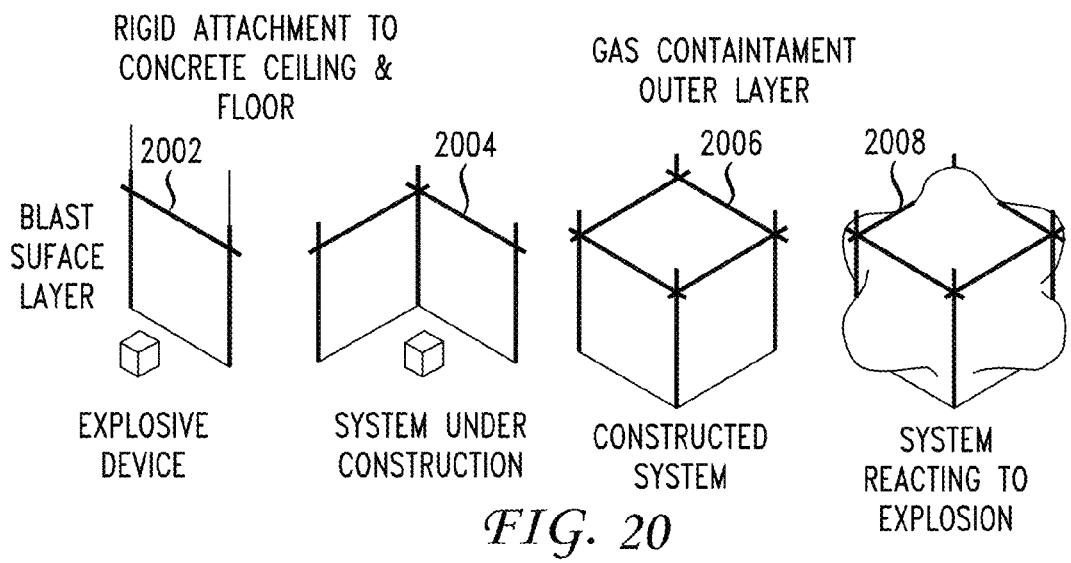
FIG. 20 illustrates building a blast layer surface around an explosive device.

FIG. 20 illustrates a 3-D grid model of the proposed fabric being assembled into a box-like configuration to contain, for example, a truck suspected of containing explosives. Depicted in FIG. 20 are several stages of setting up a first wall 0102, a second wall 2004 and the entire constructed system 2006. Feature 2008 illustrates the response of the outer layer (described below) that expands moderately as it dissipates the energy of the shock wave from the blast. The blast surface in FIG. 20 is made from, for example, one or more of the various disclosed materials.

Figure 21:
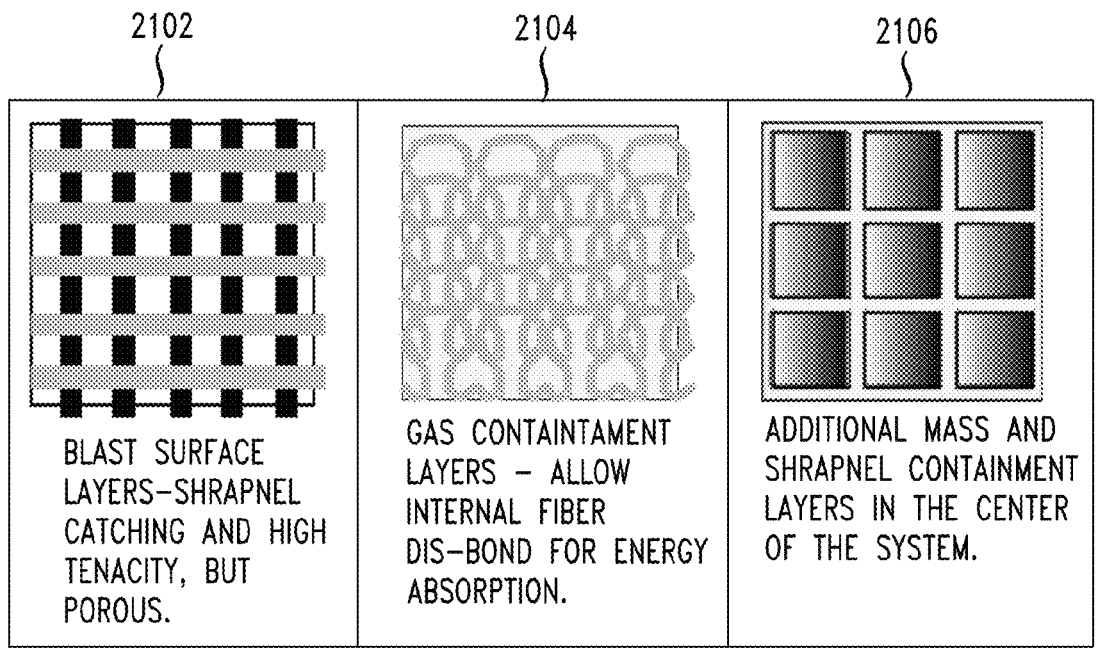
FIG. 21 illustrates various potential layers for a blast surface.

FIG. 21 illustrates potential layers in the fabric portable wall. Feature 2102 is a blast surface layer which is a shrapnel-catching layer with high tenacity but is porous. The material 2102 could be woven or multiaxial warp knit, for example. Fabric 2104 is a gas containment layer which allows internal fiber dis-bonding for energy absorption. Layer 2104 can be nonwoven or weft knit or some other extensible material for example and embedded in an elastomeric system. Layer 2106 is an additional mass and shrapnel containment layer in the center of the system. This layer may have ceramic tiles to absorb energy through catastrophic failure. The layer 2106 is permeable to gas. Thus, any of the walls or ceiling depicted in FIG. 20 can be made from one or more of the layers described in FIG. 21. Any combination of layers is contemplated as well. For example, wall 2002 could include a blast surface layer 2102 with a gas containment layer 2104. The layer 2102 and 2104 could be adjacent to each other and essentially connected together as one combined material, or may be set up as separate layers that are separately attached to a floor and/or ceiling. Depending on the potential explosive device, different levels of protection can be quickly constructed to have a system like that shown in feature 2108 that will absorb the impact. The layers can be mixed and matched.

The tiles shown in FIG. 21 can be ceramic or other materials, such as a plastisol or a Bingham Plastic. They could alternatively be plates of the explicated materials. The plates can be of uniform size, e.g. about 2 inches square to simplify folding the fabric. The plates may be of differing sizes, perhaps mathematically designed, to optimize the reaction to shrapnel of different sizes. The plates may be overlapping in order to provide maximal coverage, or to continue to provide complete coverage even as the fabric layers expand to dissipate the blast front.

A surface used for blast protection can be made from a cotton fabric layer that is structured such that a yarn will break on the application of a shear threshold. Upon the force being applied, the yarn tears and ruptures so as to consume energy in breaking. This reduces the peak energy transferred to the surface of the structure or individual, thus reducing the probability of damage or injury. In another embodiment, the yarn can be made from an appropriate chemistry and diameter to have a target failure threshold, e.g. polyester, nylon, or glass.

In another embodiment, the fabric layer can be a helical-auxetic yarn that becomes thicker as it extends and prevents percussive force from penetrating deeper as the fabric structure becomes more porous. In another embodiment, the auxetic yarn can have a different structure or chemistry that causes the yarn to become thicker as it extends when under tension. In yet another embodiment, the fabric layer can be a textile with loops of cotton yarn woven in such a way as to form 1 inch loops (or any size of loops from 0.1 inch to several feet) that are connected with yarns of a lower modulus such that under percussive force and the resulting extension will break and allow the fabric to expand before breaking again. In another embodiment the fabric layer can use loose weaves that take a zig-zag or other pattern that allows expansion.

In another embodiment, the layer can be a plate composed of one or more types combinations of the Bingham plastic, rubbery elastic plastic or foam plastics of other embodiments disclosed herein and arranged in a fish-scale pattern. In another embodiment, the plates overlap in other patterns. For example, the plates can be arranged such that the plates are contiguous and butt against each other. The plates can be arranged such that the plates are non-contiguous and are placed so as to optimize or improve the interaction with an impacting force. The textile can also be an ordinary textile.

In some cases above, this disclosure reference electronic components. Embodiments within the scope of the present disclosure that can be part of any electrical component may also include tangible and/or non-transitory computer-readable storage media for carrying or having computer-executable instructions or data structures stored thereon. Computing devices that may be used include the basic computer components such as a processor, a bus, input/output mechanisms, a transmission system including a transmission and/or receiving antenna, and so forth. Non-transitory computer-readable storage media or computer-readable storage devices can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A helmet comprising:
a shell;
a plastic that changes from a solid to a liquid at an impact above a shear threshold, wherein the plastic is created by mixing water, vinyl alcohol, sodium tetraborate and fibers to yield a mixture that is stirred into a homogeneous gel-like substance that hardens into the solid; and
a container that stores the plastic, wherein the container is attached to an exterior surface of the shell.

2. The helmet of claim 1, wherein the container is an air-tight container.

3. The helmet of claim 1, wherein the fibers in the plastic are mixed therein in different directions.

4. The helmet of claim 3, wherein the plastic has intermixed therein fibers and each of the fibers is between 0.5-5 cm long.

5. The helmet of claim 3, wherein the plastic comprises a 4% polyvinyl alcohol and 2% sodium tetraborate.

6. The helmet of claim 3, wherein the fibers are one of natural fibers, synthetic fibers and a combination of natural and synthetic fibers.

7. The helmet of claim 6, wherein, when the fibers are natural fibers, the natural fibers comprise jute fibers.

8. The helmet of claim 6, wherein, when the fibers are synthetic fibers, the synthetic fibers comprise polyethylene terephthalate fibers.

9. The helmet of claim 1, wherein the plastic comprises a first plastic in a first layer and the insert further comprises a second plastic in a second layer of the insert, the second plastic changing from a solid to a liquid at the shear threshold.

10. The helmet of claim 1, wherein the plastic comprises between 2% and 20% of hydrolyzed polyvinyl alcohol and between 0.5 and 8% borate.

11. A helmet pad comprising:
a container; and
a plastic contained within the container, the plastic comprising a layer that changes from a solid to a liquid at an impact threshold, wherein the container containing the plastic is attached to an exterior surface of a shell of a helmet and wherein the plastic is created by mixing water, vinyl alcohol, sodium tetraborate and fibers to yield a mixture that is stirred into a homogeneous gel-like substance that hardens into the solid.

12. The helmet pad of claim 11, wherein the fibers in the plastic are mixed therein in different directions.

13. The helmet of claim 1, wherein the plastic is in a first plastic layer and wherein the shear threshold is a first shear threshold, the helmet further comprising:
a second plastic that changes from a solid to a liquid at an impact above a second shear threshold, wherein:
the second plastic is created by mixing water, vinyl alcohol, sodium tetraborate and fibers to yield a mixture that is stirred into a homogeneous gel-like substance that hardens into the solid;
the second plastic is within a second plastic layer;
the first shear threshold differs from the second shear threshold based on different percentages of the sodium tetraborate in the first plastic layer and the second plastic layer; and
the container stores the first plastic layer and the second plastic layer.

* * * * *